Sept. 7, 1937. G. FLEISCHEL 2,092,446
VARIABLE SPEED AND AUTOMATICALLY DRIVEN TRANSMISSION
Filed Sept. 28, 1933 6 Sheets-Sheet 1
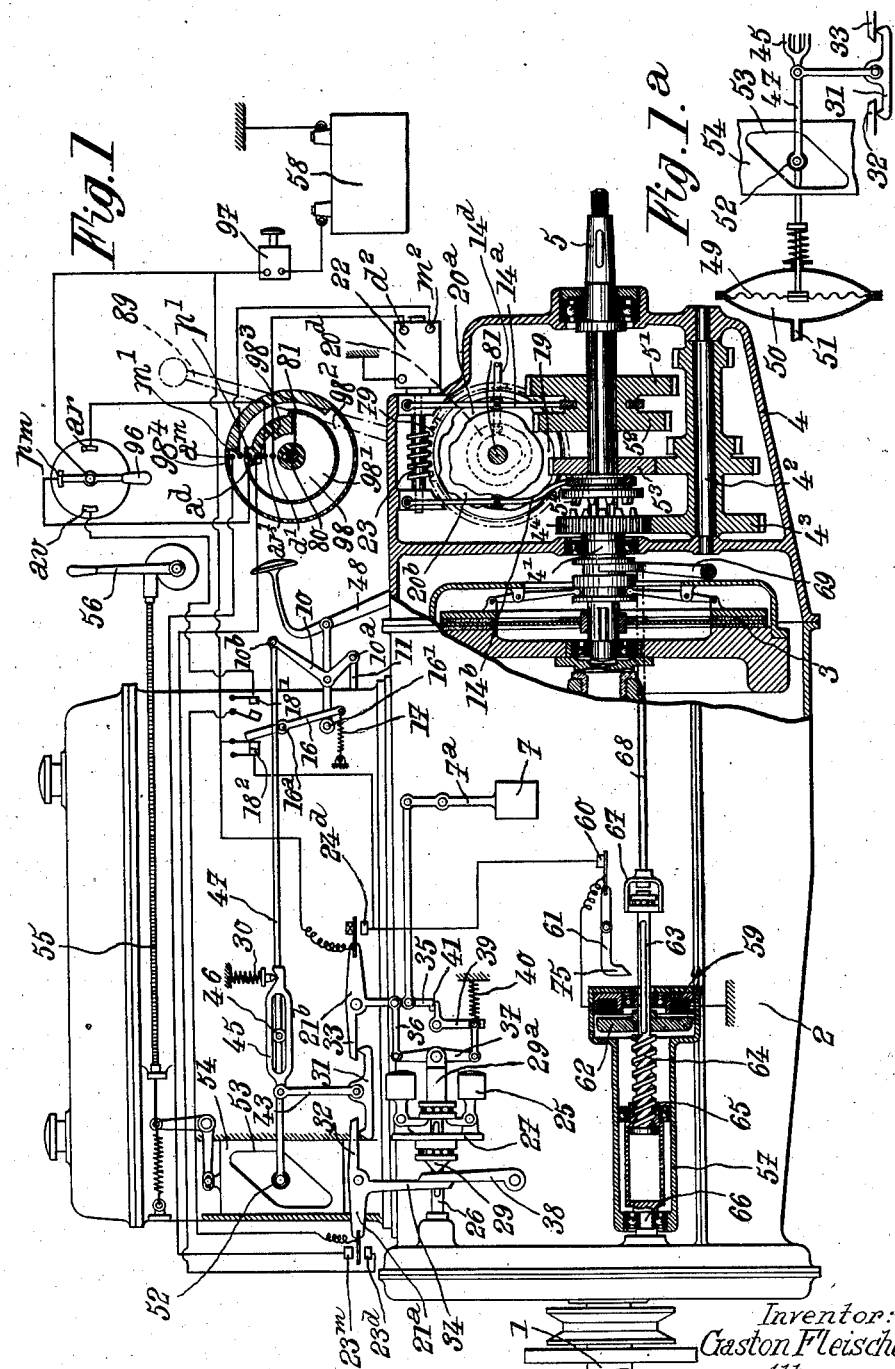
Inventor:
Gaston Fleischel
Attorneys:

Sept. 7, 1937.　　　　　G. FLEISCHEL　　　　　2,092,446
VARIABLE SPEED AND AUTOMATICALLY DRIVEN TRANSMISSION
Filed Sept. 28, 1933　　　6 Sheets-Sheet 2
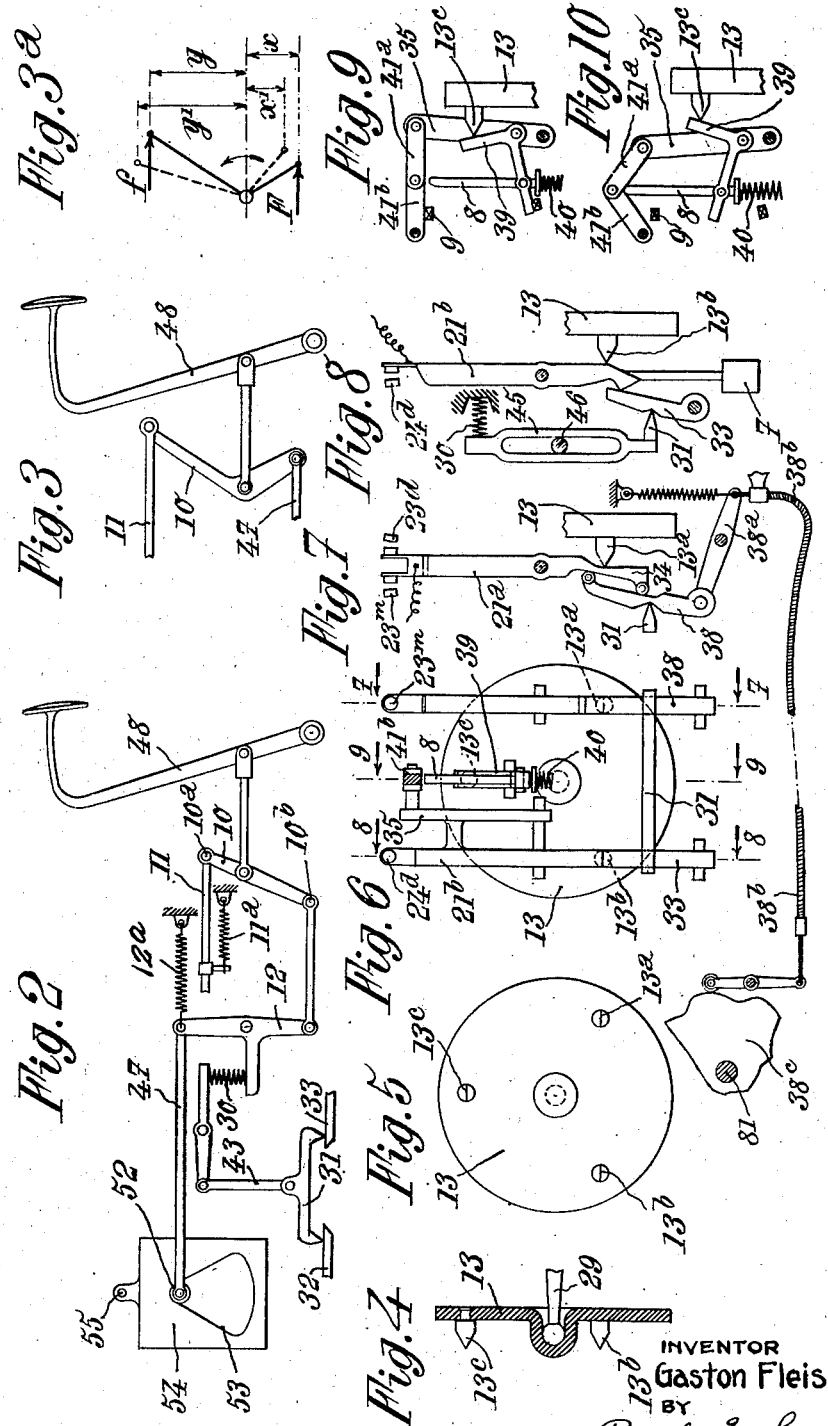
INVENTOR
Gaston Fleischel
BY
Bailey & Larson
ATTORNEYS Sept. 7, 1937.                G. FLEISCHEL                 2,092,446
              VARIABLE SPEED AND AUTOMATICALLY DRIVEN TRANSMISSION
                    Filed Sept. 28, 1933        6 Sheets-Sheet 3
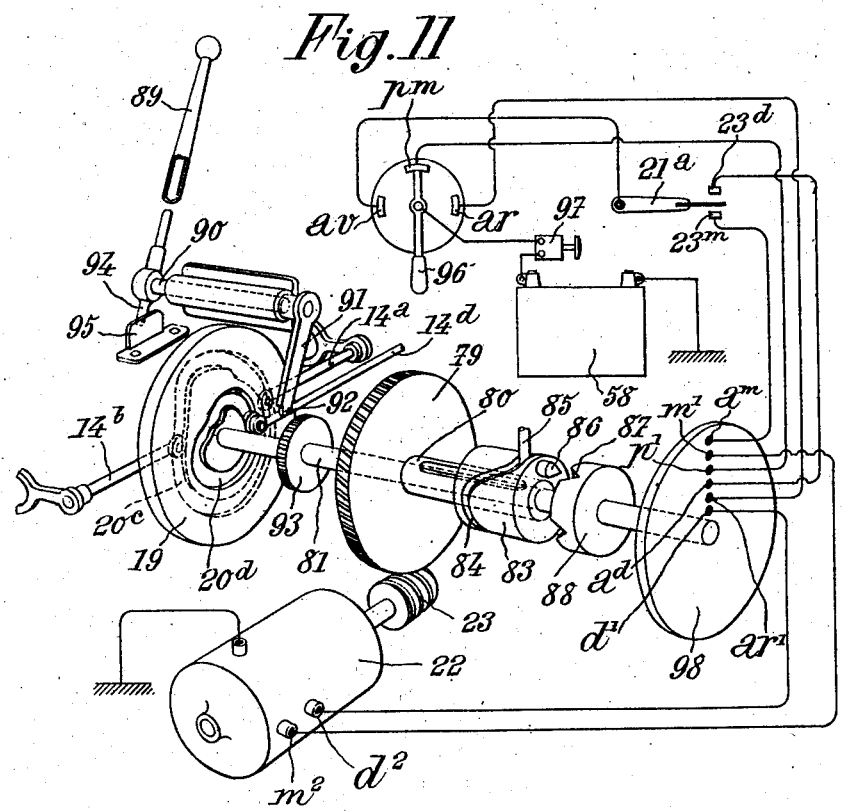
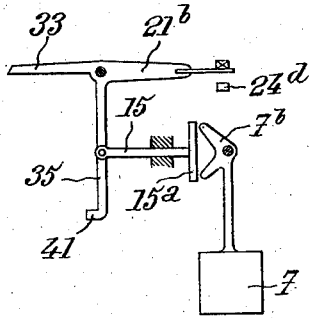
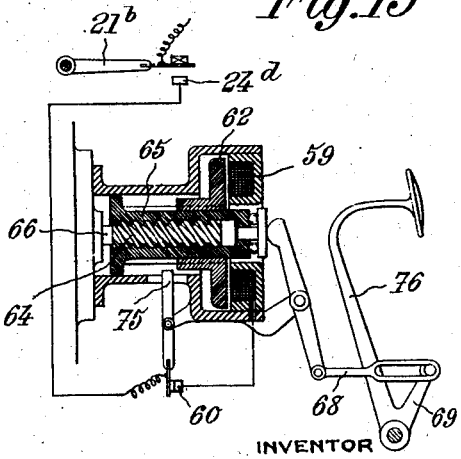
INVENTOR
Gaston Fleischel
BY
Bailey & Larson
ATTORNEYS

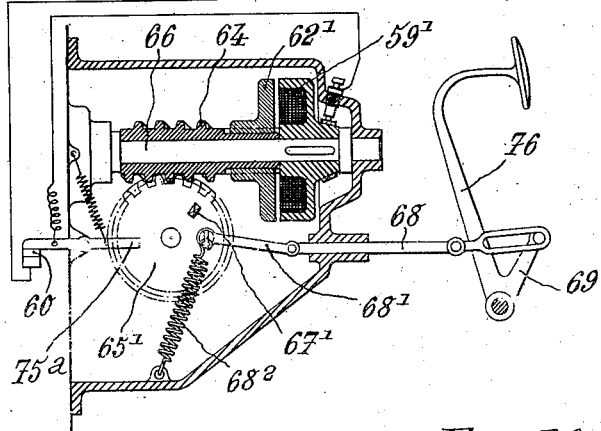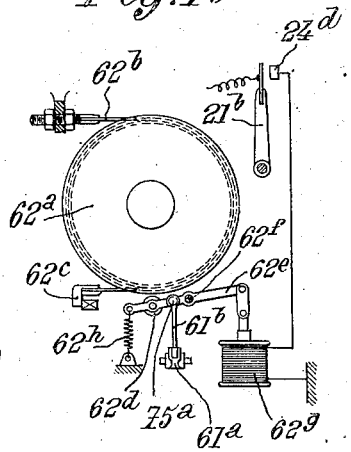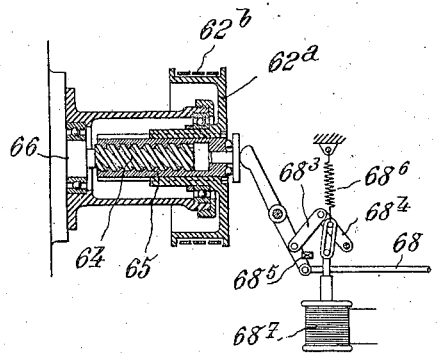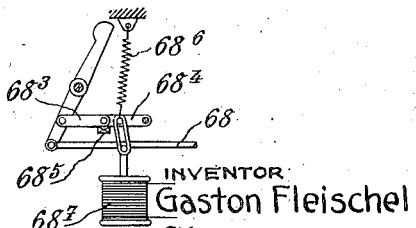

Sept. 7, 1937.  G. FLEISCHEL  2,092,446
VARIABLE SPEED AND AUTOMATICALLY DRIVEN TRANSMISSION
Filed Sept. 28, 1933  6 Sheets-Sheet 5

INVENTOR
Gaston Fleischel
BY
Bailey & Larson
ATTORNEYS

Sept. 7, 1937.　　　　G. FLEISCHEL　　　　2,092,446

VARIABLE SPEED AND AUTOMATICALLY DRIVEN TRANSMISSION

Filed Sept. 28, 1933　　　6 Sheets-Sheet 6

INVENTOR
Gaston Fleischel
BY
Bailey & Larson
ATTORNEYS

Patented Sept. 7, 1937

2,092,446

UNITED STATES PATENT OFFICE 2,092,446

VARIABLE SPEED AND AUTOMATICALLY DRIVEN TRANSMISSION

Gaston Fleischel, Bleneau, France

Application September 28, 1933, Serial No. 691,388
In Belgium October 5, 1932

42 Claims. (Cl. 192—.01)

My invention concerns variable speed and automatically driven transmissions and more especially, but not exclusively, transmissions of that kind for automobile vehicles.

By "variable speed transmission" I mean, in a general manner, the mechanical system provided between a driving portion (engine) and a working portion (vehicle wheels) of a mechanism, said mechanical system comprising, among other things, a clutch mechanism, a gear box, and brakes. These mechanisms are actuated, in the case of ordinary automobile vehicles, by means of various control arrangements (levers and pedals) on which the driver must act often when driving the vehicle.

There are known devices for automatically controlling the clutches, not only when passing from one speed to another when it is necessary, but also for the periods of starting and of stopping of the vehicle, these two kinds of control devices being possibly combined together.

There are also known automatic control devices for gear boxes, whatever be the kind of gear box (sliding gears, planetary gears, progressively meshing gears, etc.). However these devices act only for modifying the ratio of the transmission that connects the engine to the working portion (wheels). When the direction of running must be reversed, or when the vehicle must be stopped, it is useful that the driver should intervene personally since his decision must remain necessary.

The object of the present invention is to provide a variable speed transmission in which automatic controls are substituted every time this is possible for the manual operations to be performed by the driver for operating the clutch and the gear box, the whole of which will be designated, in the following description, by the general term "transmission".

To this effect, according to the chief characteristic of my invention, I provide various mechanisms (releases) for automatically controlling the working of the clutch device and of the gear box of transmissions of the kind above referred to, and I cause said release devices to be subjected simultaneously and constantly, from the starting of the engine to its running at the maximum speed, to the action of the same functional factors and of the same opposing arrangements, the respective effects of which are distributed on these different release devices.

Another feature of my invention consists in causing the variable functional factors in question, which are to control the transmissions according to my invention, and also the opposing means above referred to, on a single arrangement (equalizer) adapted to distribute suitably the variable actions to which it is subjected before transmitting them to the different release devices provided in the transmission.

A third feature of my invention consists in providing means for automatically modifying the effect of the actions, common to the different release devices, according to the variations of at least one of the functional factors that are brought into play.

A fourth feature of my invention consists in providing the transmissions with which the invention is concerned with a release device for letting in the clutch and a release device for disengaging the clutch, so as to automatically control the operation of the clutch mechanism, and with a change speed release device, adapted to automatically control the working of the gear box.

A fifth feature of my invention consists in providing the release device for disengaging the clutch with locking means that are automatically brought into play at the desired speed for maintaining said release device in the position for which it keeps the part of the clutch in engagement, said locking means being automatically caused to cease to act, so as to permit the members of the clutch to become disengaged, for a speed that is different from that at which the locking action took place, owing to the action of opposing means different from those that act on the release device for letting in the clutch.

A sixth feature of my invention consists in providing the opposing means associated at least to the gear box release device with means for modifying the working conditions, which are actuated either by the driver or automatically, and the displacements of which can be limited through the intermediary of a cam having an adjustable position.

A seventh feature of my invention (which is more especially applicable to the case in which one of the variable functional factors is the speed of an element included in the transmission, this factor being transformed into the energy developed by a centrifugal governor) consists in arranging said governor in such manner that its masses, and also the member to which they are articulated, are capable of assuming a sliding differential movement with respect to the member by which they are driven, in such manner that the relative displacements resulting from this differential movement can be utilized, respectively, for the individual operation of the release devices included in the transmission.

An eighth feature of my invention (which is more especially applicable to the case of a rotary servo-motor performing the operations controlled by the gear box release device, so as to pass from one speed to another one) consists in providing, between the shaft of the servo-motor and the driving member (cam shaft or cam plate) of the gear box, connecting means that cause said driving member to move angularly, through a determined angle, after which movement the connection is immediately and automatically cut off.

A ninth feature of my invention consists in rigidly connecting together the driving member (cam shaft or cam plate) of the gear box and emergency means adapted to be actuated by the driver in order to displace said member with an intermittent movement in the suitable direction and with the necessary amplitude, so as to control said gear box in the case of the automatic control ceasing to work.

A tenth feature of my invention consists in causing the automatic operations of the clutch mechanism to take place, under the control of the release device for letting in the clutch and of the release device for disengaging the clutch, through the medium of a mechanism actuated by the engine with which the transmission is associated, any servo-motor being then dispensed with.

An eleventh feature of my invention consists in associating with the servo-motor of the clutch device means for obtaining, either compulsorily or contingently, the uncoupling of the engine as soon as work is not required therefrom, and its coupling when its power is again required (the engine then acting through a kind of free-wheel mechanism).

A twelfth feature of my invention consists in associating with the servo-motor of the clutch mechanism, means, preferably adjustable, for ensuring the progressivity of the action of the clutch.

A thirteenth feature of my invention consists in adding to the clutch device means through which the coupling of the engine and of the transmission is possible only when the members to be coupled together in the clutch mechanism have respective speeds of revolution that are but very little different from each other.

A fourteenth feature of my invention consists in providing the transmission in question with a pendular means sensitive to accelerations of the vehicle and in causing the inertia to which said pendular mass is subjected to participate in the combined action of the forces that act on at least one release device so as to modify the working conditions.

Preferred embodiments of my invention will be hereinafter described with reference to the accompanying drawings, given merely by way of example, and in which:

Fig. 1 is a side view, partly in section, of the whole of a transmission for an automobile vehicle made according to a first embodiment of the invention;

Fig. 1a shows a modification of a portion of the device according to Fig. 1.

Fig. 2 is a diagrammatical view of a variation of a control arrangement shown in Fig. 1;

Fig. 3 is a similar view of still another variation of the same arrangement;

Fig. 3a is a diagram illustrating the operation of the arrangement of Fig. 3;

Figs. 4 and 5 are, respectively, an axial sectional view and an elevational view of an arrangement for distributing the various actions between the release devices;

Fig. 6 is an elevational view of the distributing arrangement according to Figs. 4 and 5, together with the mechanisms on which it acts;

Figure 19:
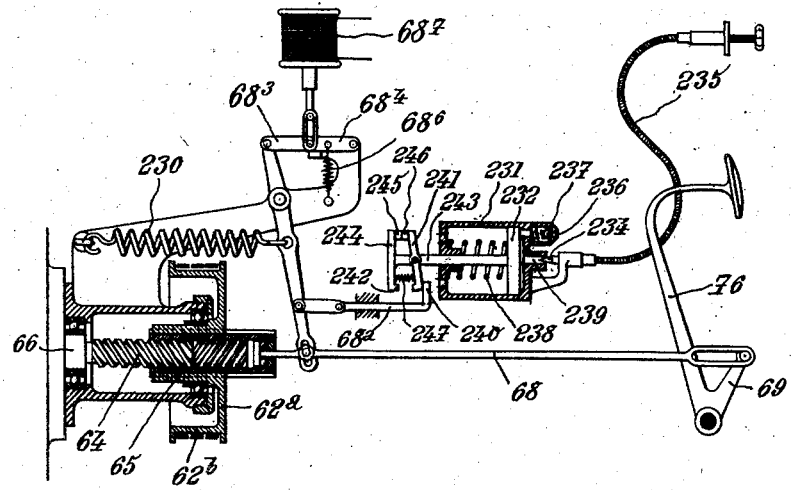
Figure 20:
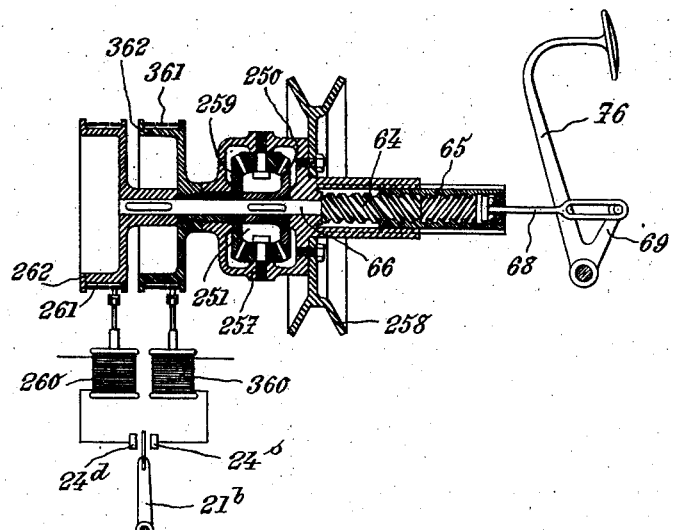

Figs. 7 and 8 are vertical sectional views on the lines 7—7 and 8—8 of Fig. 6 respectively;

Figs. 9 and 10 are both vertical sectional views on the line 9—9 of Fig. 6, the various elements of the device being in different positions in these two figures;

Fig. 11 is a perspective view on a larger scale of a certain number of the arrangements shown in Fig. 1;

Fig. 12 is a diagrammatical view of another embodiment including a pendular mass;

Figs. 13 and 14 are diagrammatical views showing respectively two actuating means for the clutch device, these actuating means being different from that shown in Fig. 1;

Figs. 15 and 16 show, respectively in axial section and in side elevation another actuating means for the clutch device;

Figs. 17 and 18 show, in two different characteristic positions, an auxiliary mechanism adapted to be associated with the actuating means for the clutch device;

Figs. 19 and 20 are diagrammatical views of two other actuating means for the clutch device; and Fig. 21 is a general view similar to Fig. 1 showing another embodiment of the invention.

Concerning the transmission proper, it can be made of any suitable type and, for instance, it may include in the usual manner a driving shaft 1 actuated by the engine 2 and adapted to be coupled, through a clutch 3, for instance of the friction type, with the driving shaft of a gear box 4, the driven shaft 5 of which is operatively connected with the wheels of the vehicle.

The clutch 3 is controlled by lever 69 ending in a fork and capable of being movable angularly by a link 68 in such fashion that when the said link 68 is drawn towards the left (Fig. 1) by an automatic mechanism, which will be described below, it moves the lever 69, which causes disengagement of the clutch in the same manner as if the clutch were controlled by the usual clutch pedal. When the link 68 is no longer moved by the automatic mechanism, the clutch is engaged through the action of the usual clutch springs, which moves the lever 69 to its original position shown in Fig. 1.

The driving shaft $4^1$ is connected to the driven shaft 5 through a gear box, of which the usual and simplest form is shown in Fig. 1 to aid in understanding the invention. It must be understood, however, that the invention is in no way limited to this particular type of gearing mechanism. This box includes an intermediate shaft $4^2$ carrying reducing gears, among which is a gear $4^3$ which is constantly in mesh with a driving pinion $4^4$ keyed on the driving shaft $4^1$. On the driven shaft 5 slide gears $5^1$, $5^2$ and $5^3$ are slidably mounted, these gears being controlled by levers $14^a$, $14^b$ ending in a fork, and which, in the usual manner, make it possible to obtain respectively a drive in first, second or third speed as the various slide gears are shifted into mesh with the corresponding gears on the intermediate shaft $4^2$. Direct drive is obtained when the lugs $5^4$ carried by the slide gear $5^3$ are engaged with the corresponding lugs on the driving pinion $4^4$. Reverse movement is obtained through a control $14^d$ which acts on intermediate sliding pinion 7

(not shown) which can be inserted, in the usual manner, between the slide gear 5¹ and the corresponding gear on the intermediate shaft 4². In Fig. 1, I have shown the gear box in the position for third speed, and the clutch 3 engaged.

The controls of the gear box are concentrated on a single element consisting, for instance, of a rotating member such as a disc 19 fixed on a control shaft 81. Said disc may occupy several characteristic positions, the number of which corresponds to the number of working conditions under which the engine is to run. In the example given in the drawings, it has been assumed that there are six different combinations of working conditions: reverse gear, neutral, first, second, third and fourth gear, so that disk 19 can be brought into six characteristic different positions, with for instance an angular interval of 60° between two successive positions. In one of the faces of the disk there are provided one or several cam-forming grooves, such as 20ª and 20ᵇ, which are adapted to cooperate with oscillating levers or sliding rods such as 14ª and 14ᵇ respectively, said levers acting on the slide gears 5¹—5² and 5³ respectively in order to perform the necessary operations for changing gear. In the other face of the disc is provided another cam groove 20ᵈ cooperating with the control rod 14ᵈ of some mechanism of the vehicle.

The operating elements (oscillating lever 69 for the clutch 3 and disc 19 for the gear box) are operated through a mechanism, called "release device" which serves, so to speak, to give the orders of the operations to be performed by the gear box or by the clutch, as explained in my prior patent 1,893,644 of March 4, 1931 but with improvements that will appear from the following description. This mechanism is made in two parts one of which, called "gear box release device" is intended to control, through operating disk 19', the working of gear box 4, while the other one, called "clutch release device" is intended to control independently the working of clutch 3, through lever 69.

The gear box release device comprises an oscillating lever 21ª adapted to control from a distance the working of disc 19', through electric connections for instance. As shown in Fig. 1, disk 19' may be driven by an electric servo-motor 22 capable of rotating in one direction or in the opposite one, said electric motor having, carried by its shaft, an endless screw 23 meshing with a toothed wheel 79 keyed on the shaft 81 of disk 19'. When lever 21ª is in its intermediate position it is out of contact with the contacts of the feed circuit of the motor 22 and the latter is stationary. If lever 21ª is caused to rotate so as to cause the gear box to pass to a higher speed, it comes into contact with 23ᵐ, electric current is supplied to motor 22 through contact m² and disk 19' is caused to rotate in the direction that corresponds to passing to a higher speed. If lever 21ª rotates in the opposite direction, when the speed is to be changed to a lower speed, until it comes into contact with contact 23ᵈ, the motor is fed with electric current through terminal d² and the disk 19' is caused to rotate in the opposite direction, thus causing the engine to pass to a lower speed.

The clutch release device comprises an oscillating lever 21ᵇ, capable of closing an electric circuit by coming into contact with a contact 24ᵈ when the clutch is to be disengaged, and on the contrary to open the same circuit by moving away from said contact, when the clutch is to be let in.

These results can be obtained because the two oscillating levers 21ª and 21ᵇ are urged on the one hand by forces determined by the functional factors of the transmission and on the other hand by an opposing action exerted for instance by a spring 30, the effect of which is preferably variable with one or several functional factors which may be different from those above considered. According to the states of equilibrium or of lack of equilibrium that result from the variations of the values of these forces, the oscillating levers are caused to assume the characteristic positions for which they close or open the electric circuits that have been above referred to.

In the different figures of the drawings, I have supposed, for the sake of simplicity, that recourse were had only to one active functional factor, which is for instance, the speed of the engine, such as results from the centrifugal force exerted on the masses 25 of a governor 27 driven by shaft 26, which is connected to the engine. The functional factor that modifies the effect of spring 30 is for instance the load of the engine. The latter is determined by the position of the throttle pedal 48. The load on which the engine is working is the greater as said pedal is more depressed toward the left hand side of Fig. 1. Now this displacement also causes a displacement of a link system 47 and of a roller 46 which acts as a pivoting axis for a slide 45 which cannot be given a translatory movement but can only oscillate and on one end of which spring 30 acts. Connecting rod 43, pivoted to the other end of slide 45, is therefore subjected to an effort, which is that exerted by spring 30, but increased or reduced according to the values of the respective lever arms of oscillating slide 45, which depend on the position of roller 46 about which said slide can pivot. The effort of spring 30 is transmitted by connecting rod 43 to the remainder of the mechanism and it is the greater as the load of the engine is greater.

An equalizing bar 31 distributes this variable action of spring 30, between oscillating lever 21ª for the control of the speed changing mechanism and oscillating lever 21ᵇ for the control of the clutch mechanism, through the intermediary of two push elements 29 and 29ª respectively, for instance. To this effect, disk 27, which carries the centrifugal masses 25 is mounted in such manner that it can slide on shaft 26 while it is angularly driven by it in a positive manner. The masses 25 then act on one of the push members, for instance 29, in the ordinary manner but the reaction of the members subjected to the action of spring 30 pushes off sliding disk 27 until the pressure with which it is applied against lever 21ª balances the action of spring 30. Thus the action of the masses is transmitted equally to the two push members 29 and 29ª.

The gear box release device consists of a plurality of levers one of which 38 is subjected to the action of the governor, through push member 29, while the other, which is of the shape of a T for instance (for the sake of the simplicity of the description) comprises a branch 34 that is in contact with lever 38 and partly covers it. The branch 21ª constitutes the oscillating lever for the control of the gear box control device above referred to. Branch 32 is subjected to a portion of the effort exerted by spring 30, said portion being determined by equalizing bar 31 and serving for the control of the gear box release device.

This portion of the effort of spring 30 varies with the load of the engine.

When the force developed by the governer and that of spring 30, applied at 32, are momentarily equal, the system of levers 38—34 is in equilibrium and lever 21ᵃ occupies the intermediate position shown in Fig. 1.

When the action of spring 30 is stronger, the whole system is moved by said spring and lever 21ᵃ comes into engagement with electric contact 23ᵈ. The electric circuit of terminal $d^2$, which causes the passing to a lower speed, is then closed.

When the centrifugal force developed by the speed of revolution in the governor is in turn stronger lever 21ᵃ comes against contact 23ᵐ and closes the circuit of terminal $m^2$, which causes the passing to a higher speed.

It should be noted that in my prior patent applications I described levers similar to 34 and 38 which were provided with rollers at their points of contact. This feature is not at all necessary and the working is quite as satisfactory when plane faces of levers 34 and 38 cover each other as shown in Fig. 1.

The clutch release device is in fact composed of two elementary mechanisms. It comprises a push element 29ᵃ, which is subjected to the action of the centrifugal force and transmits it to an equalizing bar 37 in order that the latter may distribute this action between the two elementary mechanisms above referred to.

The first elementary mechanism, which is more particularly intended to cause the letting in of the clutch, and which will be hereinafter called the clutch release device proper, comprises a rod 36 and a lever, for instance a T-shaped lever, one of the branches 21ᵇ of which is the clutch control oscillating lever above referred to. A second branch 35 is provided with a catch 41 and a third branch 33 receives, from equalizing bar 31, the portion of the action of spring 30 that is intended for the clutch being let in. As above explained, this partial action is modified by the variations of position of roller 46, according to the load.

It results therefrom that the opening or the closing of contact 24ᵈ takes place at a speed of revolution of the engine that varies with the load.

The second elementary mechanism, which is the second part of the clutch release device, serves more particularly to control the disengagement of the clutch and to cause said disengagement to take place at a given speed of revolution of the engine. This elementary mechanism will be hereinafter referred to as the "release device for the disengagement of the clutch." It acts by preventing the working of the clutch release device proper, for instance by locking it. To this effect, it is provided with a locking member, such as member 39, which is subjected, on the one hand to the action of the centrifugal force, supplied by governor 25 and transmitted through equalizing bar 37, and on the other hand to the action, exerted in the opposite direction, of a spring 40, of fixed, but adjustable strength.

The action of said spring 40 tends to release locking member 39 from catch 41 carried by lever 21ᵇ or rigidly connected thereto through branch 35. On the contrary, the centrifugal force tends to bring member 39 in engagement with catch 41. But this engagement is possible only when, on the one hand, the centrifugal force has compressed spring 40, which is the case as soon as the engine ceases to be idling, and, on the other hand, the fraction of the centrifugal force that is applied to the clutch release device has sufficiently moved lever 35 in order that locking member 39 may pass in front of it. This takes place when lever 21ᵇ assumes its position corresponding to the letting in of the clutch.

If the speed of revolution of the engine is higher the clutch of course remains engaged.

But, on the contrary, when the speed of revolution of the engine falls below the value for which the clutch was let in, spring 30 again supersedes the action of the centrifugal force and tends to close contact 24ᵈ. But this movement cannot take place because of locking member 39 engaged with catch 41, so that the clutch remains engaged.

It is only when the speed of revolution of the engine drops to values approximating those that correspond to the idling of the engine that spring 40 becomes stronger than the portion of the centrifugal force that is opposed to it. It then causes locking member 39 to pivot, thus disengaging lever 35 and allowing it to be moved by spring 30, which disengages the clutch.

It results from all these arrangements that the contact 24ᵈ is opened (thus causing the clutch to be let in) for a speed of revolution of the engine that is the higher as the throttle pedal is more depressed, while the same contact is closed (thus causing the clutch to be disengaged) for a given speed of the engine, close to idling conditions, which is determined by the tension of spring 40.

Furthermore the variations of the speed of the engine for which the clutch is let in follow exactly those of the conditions for which the speeds are changed since the same spring 30 exerts its variable action on the two mechanisms through slide 45 and equalizing bar 31.

It is of course possible to adjust the variation of the action of spring 30 according to the load of the engine by making use, as already described in my prior patents, of any suitable device. In Fig. 1, I have shown, by way of example, a metallic plate 54 (which will be hereinafter called a cam because it is cut away along a suitable profile 53) inside which can move a roller 52 connected to the roller 46 that varies the action of spring 30.

Plate 54 can be displaced in its own plane through controlling means 55 operated by a handle 56 actuated by the driver. The latter can thus bring at will a greater or less width of cam 53 opposite roller 52 and thus modify the limits within which takes place the variation of the effect of spring 30 as a function of the load of the engine. For certain points of the cam 53 it is even possible to make this variation equal to zero when the width of the aperture of the plate is, at the point in question, equal to the diameter of roller 52.

It is also possible to adjust the positions of rollers 46 and 52 and of rod 47 that carries them by making use of the depression in the pipe of the carburetter.

To this effect, as shown in Fig. 1a, rod 47 is fixed to diaphragm 49, which closes a chamber 50 connected to the suction pipe of the carburetter. A spring is provided for returning the rod to its initial position. In this case the rod is not connected to the throttle pedal.

If, on the contrary, use is made of the throttle pedal 48 it is necessary to provide, in the connection between said pedal and the carburetter, on the one hand, and between said pedal and rod 47, on the other hand, an equalizing bar 10, which allows the throttle of the carburetter to move its full angular displacement even if the displacement of rod 47 is very much reduced or even completely done away with by the action of cam 53.

Fig. 2 shows such an equalizing bar 10, one end 10a of which controls the carburetter through the usual linkage 11 provided with a return spring 11ª, the other end of said bar 10 being connected to rod 47 and to the devices controlled by it.

Even if roller 52 is kept stationary by cam 53, which means that for this position the working of the automatic transmission depends merely on the speed of revolution of the engine, it is clear that the control of the carburetter remains entirely free, the upper end 10ª of bar 10 then moving along a circular arc the center of which corresponds to the stationary lower end 10ᵇ of bar 10.

It should be noted that this means for limiting the influence of the load of the engine is applicable to all other systems for opposing to the centrifugal force of the governor an opposing action variable with the load of the engine.

It will be supposed, as shown in Fig. 2, that it has been found sufficient to have the tension of spring 30 modified by a movement of the throttle pedal 48, thus dispensing with the system of variable lever arms above described.

To this effect, pedal 48 is caused to act on a movable lever 12, for instance by connecting it to equalizing bar 10. Spring 30 bears against one end of said lever 12, so that the length of this spring decreases, therefore its tension increases as the pedal 48 is being depressed.

In order to give this system the advantages of the adjustment above described, it suffices to connect lever 12 to the linkage 47 above described.

It should be noted that the arrangement of equalizing bar 10 and of the return springs 11ª for the control of the carburetter and 12ª for linkage 47 is of very great importance if it is desired that the driving of the car should be agreeable. It will be supposed, in the following description, although this is not necessary, that spring 11ª has been chosen weaker than that of rod 47. The following explanations will make it easy to find the necessary modifications to be brought to the system if spring 11ª were stronger than spring 12ª.

If, under these conditions, use is made of a rectilinear bar 10, as shown in Fig. 2, the operation is as follows:

It will be supposed that pedal 48 is in its uppermost position. When said pedal is depressed, equalizing bar 10 first actuates only the carburetter throttle since the opposing spring thereof is the weaker.

When the throttle is fully open, its controlling means comes into contact with a stop provided to this effect which opposes a resistance that cannot be overcome. It is only from that time on that rod 47 begins to modify the action of spring 30 and therefore to modify the conditions under which the speeds are changed.

This embodiment is suitable in the case of the driver desiring to exhaust the possibilities of the engine without changing the speed.

If it is desired to have a different working of the device, for instance if it is desired that the changes of action of spring 30 should follow exactly the variations of position of the carburetter throttle, the shape of the equalizing bar 10 should be changed, for instance as shown in Fig. 3.

In this case, the equalizing bar is given the shape of a V the apex of which is connected to the throttle pedal and the ends of the branches of which are connected to the controls above described.

This V-shaped equalizing bar is disposed as shown in Fig. 3 if a stabilizing action is desired, or in the opposite direction in the converse case.

The length of these arms of the V is determined in such manner that the resisting moments of the controls of the carburetter and of the release devices respectively may be equal.

Under these conditions, the two mechanisms will move together since equalizing bar 10, being subjected to equal moments, is not liable to rotate in one direction or in the other.

The stabilizing action is the stronger as the angle between the branches of the V is smaller.

This is proved by the diagrammatical view of Fig. 3a. It is clear that if one of the two controlling means had a tendency to remain behind the other, for instance the lower end subjected to force F, this would produce a rotation of equalizing bar 10 in the direction of the arrow. This rotation would reduce, from $x$ to $x^1$, the effective lever arm with which the corresponding return spring acts as a resistance, and would produce a contrary effect on the other lever arm, corresponding to force $f$, which would increase from $y$ to $y^1$. The resulting modification of the moments is equivalent to the production of a torque tending to rotate the system so as to bring it back to its correct position corresponding to an equal and simultaneous displacement of the two ends of the equalizing bar.

The system is therefore of a self-stabilizing type.

This stabilization does not prevent in any way the two controls to be independent from each other. The inclination of the lever arms does not prevent the equalizing bar from performing its function, that is to say from permitting the correct working of the carburetter even when linkage 47 is stationary.

It is also possible (by giving for instance a greater or less value to the angle between the branches of equalizing bar 10, or by balancing only incompletely the resisting torques, or again by disposing the return springs in such manner that their tension varies with their displacement, or finally by causing them to act through the medium of oblique lever arms, which therefore modifies their effective moment according to the position of the system) to obtain any other adjustment and for instance (taking figures quite at random) to obtain that the carburetter throttle moves the ¾ of its total displacement before the adjustment of the transmission gear is modified, and that the variation of this adjustment corresponds to the last fourth of the displacement of said throttle.

It would even be possible, if this could correspond to a practical necessity, to exhaust on the contrary all the possibilities of the change speed device before the opening of the throttle is modified, this by inverting all that has been above explained for the control of the carburetter with respect to the control of the transmission gear, by disposing the V in the opposite direction.

It has been above explained that a complete release device may include, not only a gear box release device and a release device for letting in the clutch, but also a release device for disengaging the clutch.

The embodiments shown in Figs. 4 to 10 and 21 disclose a complete release device as above stated, which is more simple and occupies less space than that shown in Fig. 1.

In order to make it possible to utilize an ordinary governor for controlling such a release device I make use of an equalizing member 13 called a "circular equalizer", which distributes the action of governor 25 between three partial release devices. This member is shown on a larger scale in Figs. 4 and 5.

In this case governor 25 may be of any type whatever. The centrifugal force that it develops is imparted to a single push piece 29. The latter is provided at its end with a ball adapted to engage in a socket of disk 13 so that said disk can be inclined in any direction whatever with respect to push piece 29. Disk 13 is provided with three projections 13ᵃ, 13ᵇ, and 13ᶜ distributed over its periphery for instance at the apexes of an equilateral triangle. In this case the pushing action of the central ball is equally distributed between the three projections.

With such an equalizer the movement of one of the projections is without action on the position of the others and on the distribution of the forces if the angular displacements of disk 13 remain relatively small.

This device therefore distributes, in a manner entirely correct, the central push of member 29 between the three projections, whatever be their relative displacements.

I then dispose three partial release devices for instance in parallel planes and also for instance in vertical planes.

In Fig. 6, the gear box release device shown in detail in Fig. 7 is placed in plane 7—7.

Plane 8—8 contains a release device for letting in the clutch shown in detail in Fig. 8.

Plane 9—9 corresponds to a release device for for disengaging the clutch as shown in detail in Figs. 9 and 10.

With the exception of the shape of the levers which in this embodiment need not be given the shape of a T, the working of the two first release devices 21ᵃ and 21ᵇ is the same as above described for the first embodiment of my invention, the fraction of the movement that is imparted thereto acting at 13ᵃ and at 13ᵇ respectively and the opposing spring having a variable action and acting on equalizer 31 shown in profile in Fig. 6 and in end view in Figs. 7 and 8.

Fig. 7 also shows a device that permits of adapting the gear box release device to gear boxes in which the different gear ratios have any value whatever, while the embodiment of Fig. 1, for which the length along which levers 34 and 38 cover each other is constant, corresponds to gear boxes in which the gear ratios correspond substantially to a geometric progression.

In the first case it is advantageous to provide the points of contact of levers 34 and 38 with rollers in such manner that by mounting one of the levers, for instance 38, on an oscillating arm 38ᵃ, it is possible to vary the length along which the two levers cover each other, without developing an exaggerated resistance.

The length in question is determined for each combination of gears and, in order that this displacement may take place correctly, it suffices to provide for the movement of pivoting member 38ᵃ, for instance by means of a flexible transmission 38ᵇ (see also Fig. 21), through a cam 38ᶜ keyed on the shaft 81 of the gear box (Figs. 1 and 21) and the angular position of which, as above explained, determines the combination of gear wheels that is caused to work.

In this way, with a cam 38ᶜ of suitable outline, it is possible to give the length along which levers 34 and 38 cover each other the exact value that corresponds to the combination that is utilized, whatever be the relative values of the different gear ratios of the gear box.

However Figs. 9 and 10 show (Fig. 9 in the position for which the clutch is let in and Fig. 10 in the position for which the clutch is disengaged) a release device for disengaging the clutch that makes use for the retaining device of an arrangement that is more sensitive than the device for locking pieces 39 and 41 shown in Fig. 1.

In this case also lever 38 is caused to rotate together with oscillating lever 21ᵇ, but instead of stop 41 it carries at one of its ends a kind of chain the links 41ᵃ and 41ᵇ of which are brought in line with each other against a stop 9 when lever 35, moved to the end of its stroke by the fact that the centrifugal force has overcome the resistance of variable action spring 30, is in the position that corresponds to the clutch being let in.

In this position, the two links of the chain, placed in line with each other, determine a dead center for lever 35 so that said lever is immobilized, whatever be the direction and the strength of the impulsions imparted thereto. In particular lever 35 and also oscillating lever 21ᵇ are compelled to remain in the position that corresponds to the clutch being let in when the centrifugal force that acts on the release device for letting in the clutch drops back to a value smaller than the strength of spring 30, which would cause the parts to come back to the position for which the clutch is disengaged, were it not for the presence of the two links 41ᵃ and 41ᵇ.

This situation lasts as long as the portion of the centrifugal force that acts on lever 39 through projection 13ᶜ above referred to is sufficient for compressing spring 40, that is to say as long as the speed of revolution of the engine is higher than that corresponding to idling.

But when the speed of revolution of the engine becomes but little different from said value corresponding to idling, spring 40 overcomes the action of the centrifugal force and causes lever 39 to pivot. Said lever, owing to push piece 8, lifts the central articulation of the chain 41ᵃ—41ᵇ and moves the links away from the rectilinear position that they occupied. Consequently, lever 35, and also lever 21ᵇ can again assume their positions corresponding to the disengaging of the clutch, under the combined action of springs 30 and 40.

It will be seen that the operation is identical to that of the device shown in Fig. 1.

In my prior patents I described the utilization of a pendulum for correcting the action of the clutch according to the value of the accelerations to which the vehicle is subjected.

This pendulum can be advantageously combined with the release device for letting in the clutch itself.

If it is desired to correct only the accelerations in the direction that corresponds to the vehicle being driven by the engine, the device shown in Fig. 1 will be sufficient.

The pendulum 7 is connected to one of the levers, for instance the lever 35 of the release device for letting in the clutch, through a connecting rod 7ᵃ, the connection being so devised that when pendulum 7 is moved away from the vertical position by a force resulting from a positive acceleration, this force is transmitted to the release device for letting in the clutch in such manner as to tend to disengage the clutch. Thus, if the engine imparts to the vehicle too sudden an acceleration, the pendulum causes the clutch to be slightly disengaged so as to reduce the impulsion imparted to the vehicle.

As long as there is not an excessive acceleration the force developed by the pendulum is negligible. It accompanies the movements of the release device without interfering with them.

Besides, it is possible to simplify the device above described in the manner disclosed in Fig. 8 by disposing the pendulum directly in line with the lever, such as 21b, for which the disengaging of the clutch corresponds to the direction of the acceleration that it is desired to moderate.

It may be also desired that the disengaging of the clutch should take place whatever be the direction of the excessive acceleration to which the vehicle is subjected.

As a matter of fact it does not matter very much whether, in the case of too violent a braking, the clutch is disengaged.

But it may be very advantageous to automatically disengage the clutch if the engine, being injured suddenly stops, which, in the absence of said automatic action would lock the rear wheels of the automobile and might cause a very serious accident.

In this case, as shown in Fig. 12, lever 35, or any other lever rigidly connected to clutch lever 21b is provided with a small rod 15 the end of which carries a small plate 15a. The pivot of pendulum 7 is located opposite and close to the center of said small plate and the pendulum is provided with two levers 7b forming a V and also located opposite the small plate. Between the free ends of levers 7b and small plate 15a there is left the clearance space necessary to the working of the release device lever 21b.

It will be readily understood that, whatever be the direction in which pendulum 7 is caused to rotate under the effect of an excessive acceleration (either positive or negative) one of the two levers is always in a position to act on the said small plate 15a, so as to impart to lever 21b the inertia resulting from the acceleration, thus causing the clutch to be disengaged.

Therefore, whatever be the direction of the excessive acceleration to which the vehicle is subjected, the clutch tends to be disengaged.

If it is desired to provide a mechanism that is both capable of acting in opposite directions and very simple, it is possible, as shown in Fig. 21, to cause pendulum 7 to act directly, through its V disposed levers 7b, on the side of one of the levers of the clutch release device, which side of the lever plays the same part as small plate 15a in the embodiment of Fig. 12.

It is easy, with the arrangements above described, to obtain, if desired, that the engine should be uncoupled as soon as work is no longer required from it, and to couple it again as soon as work is required therefrom.

To this effect, as shown in Figs. 1 and 21, an oscillating lever 16, pivoted about a stationary spindle 16a and subjected to the action of a spring 17 that tends to close a switch 18¹ placed for instance on one side and to allow another switch 18² placed, for instance, on the other side to open, is made use of.

The first switch 18¹ is inserted in the electric circuit that feeds current from the source of energy 58 to the lever 21a of the gear box release device. The latter is therefore normally fed with electric current.

The second switch makes it possible to feed current, when it is closed, to the terminal 24d of the clutch release device and this directly from source 58. As switch 18² is normally open, nothing is changed in the normal working of the clutch release device.

But when the throttle pedal 48 is allowed to occupy its upper position, a roller 16¹, integral with said pedal, causes lever 16 to pivot and thus to open switch 18¹ and to close switch 18² as shown in Fig. 1.

It results therefrom that the terminal 24d of the clutch release device is directly fed, whatever be the position of the clutch release device. The disengaging of the clutch then takes place as will be hereinafter explained.

Furthermore, due to the opening of switch 18¹, the lever 21a of the gear box release device is no longer fed with current so that the speeds cannot be changed for the whole time during which the engine is uncoupled as above explained.

As soon as the driver again causes the engine to act on the wheels of the vehicle, by depressing ever so little the throttle pedal 48, lever 16 is released by the corresponding roller 16¹ and the switches 18¹ and 18² are brought back to the positions corresponding to normal working.

The result thus obtained is equivalent to that of a free wheel consisting of mechanical devices for driving the wheels for one direction only of rotation thereof.

This kind of free wheel running can be made temporary.

To this effect, I may for instance cause lever 16 to slide along its spindle so that it can be brought opposite the roller 16¹ carried by pedal 48, thus obtaining the free wheel working above described.

I may also cause lever 16 to slide in such manner that roller 16¹ can no longer touch it when moved by pedal 48, and in this case the free wheel conditions of running are interrupted.

The device just above described can be arranged in such manner that the engine is again coupled with the transmission only when the respective speeds of revolution of the members to be coupled together in the clutch are very close to each other, in such manner as to avoid any shock in the working of the device.

To this effect I have recourse to the arrangement shown in Fig. 21 of the drawings, which comprises a screw 211 provided, if possible, on the driving shaft 1 or on a shaft 210 parallel to shaft 1. Said screw is advantageously relatively short and is driven through any suitable means such as a pulley, a flexible transmission or a gear 212, so as to turn with a certain ratio to the movement of shaft 1 of the engine.

In line with screw 211, there is disposed another shaft 214 to which is slidably keyed a sleeve 215 forming a nut on screw 211. Said shaft 214 also carries any suitable driving device, for instance a flexible transmission that connects it, through a gear 216, to a shaft 217 provided between clutch 3 and gear box 4, shaft 214 being caused to revolve at substantially the same speed ratio as shaft 210. Besides said shaft 217 can be the shaft that connects the clutch to the gear box. Sleeve 215 is provided with a groove 218 in which is engaged a fork 219 that tends to bring said sleeve 215 back to its intermediate position, through springs 220.

If the gear ratios of members 211 and 215 have been chosen equal, the operation of the device is as follows:

When the clutch is engaged and there is no slipping as is the normal case, the driving shaft 1 and the shaft 217 turn at the same speed of revolution. Screw 211 and the sleeve 215 that surrounds it are driven at said speed and there is no relative angular rotation of these parts. Therefore nut 215 does not move axially.

When, for the free wheel working above described, contact 18² is closed, the clutch is disengaged and the engine slows down since the throttle pedal has been previously released by the driver. The screw 211 connected to the engine then turns more slowly than the nut 215 connected to the transmission. Said nut therefore screws on screw 211 and passes on one side thereof, for instance on the left hand side of Fig. 21.

This displacement is imparted to fork 219 which, through a stop 221, closes a contact 18³ mounted in shunt with contact 18².

When the driver wishes to reestablish the normal drive, he acts on pedal 48, thus accelerating the working of the engine and opening contact 18². But contact 18³ remains closed so that the terminal of the clutch release device 24ᵈ is still fed with electric current, which maintains the clutch disengaged.

When, due to the acceleration created by the depressing of the throttle pedal, the speed of the driving shaft becomes slightly higher than that of shaft 217 connected to the vehicle and to box 4, the situation is reversed and nut 215, connected to the transmission turns at a speed slower than that of screw 211 connected to the engine.

Under the action of the springs 220, which tend to bring it back to its intermediate position, the nut can then again engage the threads of the nut and thus move until it passes on the other side. Fork 219 is caused to follow this movement and opens switch 18³. Terminal 24ᵈ is no longer fed with electric current so that the clutch can be let in, at the very moment when the speed of the engine tends to become higher than that of the transmission.

If it is desired that the clutch should be let in slightly before, or just when the shafts 210 and 214 are moving with the same speed of revolution, it suffices to slightly modify the gear ratios of the portions of the device that has just been described, in such manner that the portion driven by the transmission may turn slightly more quickly than the portion driven by the engine. In this way, the axial movement of the screw-nut system takes place a little earlier than above explained and not when the speed of the engine tends to become higher than that of the transmission.

I will now proceed to explain how the decisions of the gear box release device and those of the clutch release devices (that is to say the release devices for letting in the clutch and for disengaging it) are effectively performed. In order to facilitate the explanations I will now call "clutch control device" the apparatus that executes the orders of the release device for letting in the clutch and of the release device for disengaging the clutch, and "gear box control device" the apparatus that corresponds to the "gear box release device".

The clutch mechanism 3 may be of any type whatever already used with the non-automatic transmission adapted to be used in connection with the mechanism considered. This clutch mechanism is operated for instance, as is very often the case, by the rotation of its lever 69 through a certain angle in one direction for letting in the clutch and in the opposite direction for disengaging the clutch.

In a likewise manner the gear box may be of any type whatever, because its automatic control can be performed in exactly the same manner as by the driver.

The only modification brought to these organs is that the controls have been all connected to a single device 81, which is the shaft referred to in connection with Figs. 1 and 21. As above explained this shaft is arranged in such manner as to assume a certain number of characteristic positions each of which corresponds to a well determined condition of working.

In order that their usual transmission may work automatically, it is necessary to ensure the angular pivoting of the control lever 69 of the clutch, this function being performed by the clutch control device, and to turn shaft 81 so as to bring it to its various characteristic positions, this function being performed by the gear box control device.

The clutch control device 57 shown in Fig. 1 is given a reciprocating movement. It comprises a shaft 66 driven by the engine and hollowed out so as to form a nut 65 provided with threads of relatively large pitch so as to be reversible.

In this nut is placed a screw 64 integral with a shaft 63 slidably keyed in the movable armature 62 of an electro-magnet 59 which is maintained stationary. The winding of said electro-magnet is connected to the terminal 24ᵈ of the release device, a circuit breaker 60 the function of which will be hereinafter described being interposed in the connection.

As shaft 63 can rotate, there is disposed at 67 a stirrup bearing against it through a ball thrust bearing and connected on the other hand to the rod 68 that acts on the clutch operating lever 69.

It has been above explained that as long as the clutch is to be in engagement, the release devices for letting in the clutch and for disengaging it cut off the current at terminal 24ᵈ.

Under these conditions the electro-magnet 59 is not energized and the whole of the nut-sleeve 65, screw 64, shaft 63 and armature 62 rotates together with the engine.

But when current is fed to terminal 24ᵈ, either through the release device 21ᵇ for disengaging the clutch, or through the free wheel running device 16, the winding 59 of the electro-magnet is energized and it attracts the rotating armature 62 the speed of which it brakes, thus braking the speed of screw 64. As the nut-sleeve keeps turning at the same speed as the engine, there is an axial displacement of one of said pieces (in the present case of screw 64) and the movement of screw 64 with respect to nut 65 actuates the clutch control mechanism.

The movement is stopped when the stirrup 67 comes into contact with the end 75 of a lever 61, which causes the latter to pivot and actuates a circuit breaker 60 which cuts off the feed of current to the electro-magnet 59.

The armature 62 is thus released and the threaded rod 63, subjected to the action of the return springs of clutch 3, tends to move toward the right hand side of Fig. 1, which immediately reestablishes the current at 60. There is thus obtained a series of oscillations on either side of the position for which the clutch is disengaged. However the clutch remains disengaged until the driver, wishing to start again, accelerates the speed of revolution of the vehicle.

As soon as the optimum conditions of working have been obtained, the release device for letting in the clutch cuts off the current at 24$^d$. The electro-magnet 59 is no longer excited; its armature 62 is released and under the action of the springs of the clutch mechanism 3 the mechanism is ready to be again let in.

Fig. 13 shows another embodiment of the clutch control device in which screw 64 is cut in the driving shaft 66 and cannot move axially, while nut 65 is capable of unscrewing and of exerting an axial thrust when it is braked by electro-magnet 59. Its movement is then transmitted to the control lever 69 (with a pedal 76 for disengaging the clutch) through any suitable connection. The working of this system is obviously analogous to that described with reference to Fig. 1.

Fig. 14 shows another embodiment of the clutch control device, in which use is also made of a screw 64 meshing, in this case, with a tangential wheel 65$^1$ instead of nut 65. However in this case the brake 59—62 of Fig. 1 should be replaced by a clutch 62$^1$—59$^1$. To this effect, the shaft 66, connected to the engine, carries a screw 64 adapted to turn freely on said shaft and rigidly connected to the armature 62$^1$ of an electro-magnetic clutch 59$^1$, for instance, which is itself keyed to shaft 66. As long as this clutch is not energized, screw 64 remains stationary on rotating shaft 66. But if contact 21$^b$ is closed, the coupling takes place, wheel 65$^1$, playing the part of nut 65 of Fig. 1, turns and drives through a suitable crank-pin the connecting link 68, which pulls the clutch pedal 76 toward its position of disengagement of the clutch. When this position has been reached, a lug 67$^1$ carried by wheel 65$^1$ cuts off the contact at 60. The working of this device is therefore identical to that of the device above described.

However in this case it is possible to arrange the devices in such manner that contact 60 is opened only when the crank pin or rod 68$^1$ is close to the dead center opposed to the position of pedal 76. This arrangement renders the oscillations of the mechanism, which take place for the position for which the clutch is fully disconnected, nearly without effect on the pedal. But as the action of the clutch springs is very much reduced with such an arrangement, it is advantageous to provide a supplementary return spring 68$^2$, disposed at a more favorable angle. This spring 68$^2$ not only helps link 68$^1$ to be brought away from its dead center position but also slows down the movement at the end of the period of letting in the clutch.

The brake or clutch that acts on the clutch control device is not necessarily of an electromagnetic type.

The arrangement shown in Figs. 15 and 16 makes use of a band brake, with a "nut-screw" system that is very much analogous to that shown in Fig. 1. Pulley 62$^a$, on which the band brake acts merely replaces the movable armature 62 of the electro-magnetic brake.

Around the rim of this pulley there is wound a flexible brake band 62$^b$, preferably forming several helical turns in order to increase the braking action. This band is fixed at one end, while the other end 62$^c$ is left free. However a stop prevents an excessive unwinding of the band.

The free end of the band is located close to a roller 62$^d$ carried by a lever 62$^e$, which may pivot about a stationary point 62$^f$ under the action of an electro-magnet 62$^g$. Normally a spring 62$^h$ keeps the roller 62$^d$ away from the brake band, which is thus allowed to unwind freely, so that the brake does not act. But when the electro-magnet 62$^g$ is fed with electric current through terminal 24$^d$ of the clutch release device 21$^d$, when the latter is in the position corresponding to the disengaging of the clutch, said electro-magnet causes lever 62$^e$ to pivot, thus applying roller 62$^d$ against the free end 62$^c$ of the band and consequently applying the band against the rim. The brake band is then driven by the roller, it winds around pulley 62$^a$ and brakes the movement of said pulley. It results therefrom that the screw-nut system 64—65 pulls the control lever 69.

In a similar manner the stop (such as 75 in the embodiment of Fig. 1) that limits the displacement of the system can also act in an entirely mechanical manner.

It may consist, as shown in Figs. 15 and 16, of the end 75$^a$ of a lever 61$^a$, having for instance two branches at right angles to each other, which the connecting link 68 fixed to the pedal contacts at the end of its displacement (shown in dotted lines). Lever 61$^a$ is then caused to pivot and, through any suitable connection such as 61$^b$, this pivoting displacement compensates the effect, which is not very strong, of electro-magnet 62$^g$ and moves the end of brake band 62$^b$ away from pulley 62$^a$, thus releasing the brake.

All the clutch control devices (Figs. 1 and 13 to 16) that have been described up to now are so devised that the control lever 69 of the clutch is caused to oscillate about its position corresponding to the clutch being disengaged. This oscillating movement can be wholly eliminated by having recourse to a knuckle, as shown in Fig. 17 in the position corresponding to the clutch being let in and in Fig. 18 in the position corresponding to the clutch being disengaged.

In these figures I have shown only the devices that are necessary for understanding the working of the arrangement in question.

I dispose, at any point of link 68, a kind of chain having two links 68$^3$—68$^4$ arranged in such manner that when pedal 76 is at one of the ends of its displacement, these links make a certain angle with each other, while, when the pedal is at the other end of its displacement, the links are located in line with each other, being applied against a stop 68$^5$. It is known that, when such a mechanism occupies the last mentioned position, it constitutes what is called a "dead center", that is to say places the mechanism in such a situation that the forces that act thereon cannot move it.

Pedal 76, brought to the position for which the clutch is disengaged by the working of the brake is thus maintained in this position.

In order that the clutch may be let in, I provide on the two links of the chain a spring 68$^6$ the tractive action of which is sufficient for displacing the two links and bringing them back to their angular position for which the system is again free to move. An electro-magnet 68$^7$ is arranged to act against said spring 68$^6$ so as to neutralize its action when said electro-magnet is fed with current by terminal 24$^d$ of the clutch release device 21$^b$.

The operation of this device is then as follows: When the clutch release device is in a position corresponding to the disengaging of the clutch, it feeds current to terminal 24$^d$, which conveys this current both to brake 62, which operates the "screw-nut" system 64—65 and to the electro-magnet 68$^7$ that cooperates with the links 68$^3$—68$^4$. The "screw-nut" system causes the clutch to be disengaged, which brings the two links of the chain to the position in which they are in line with each other. The links remain in this position since the electro-magnet 68[7] neutralizes the action of spring 68[6], which otherwise might move the links away from said position.

When the clutch release device is in a position corresponding to the letting in of the clutch, it cuts the current at terminal 24[d] and as the electromagnet 68[7] is no longer fed with current spring 68[6] brings the links of the chain into a position for which they make a certain angle with each other and the system is again free to move. Under the action of the clutch spring (or springs), the clutch can then be let in since the "screw-nut" system is reversible and the links 68[3]—68[4] are no longer in line with each other.

The mechanism that has just been described is so devised that the disengaging of the clutch is controlled by the "screw-nut" system, while the wedging of the two links in line with each other keeps the clutch out of engagement against the action of the clutch spring (or springs). It may be desired to have a reversed arrangement, that is to say the "screw-nut" system serving to let in the clutch, which is maintained in this position by the wedging of the links of the chain in line with each other. This arrangement may have, in some cases, the advantage that the disengaging of the clutch can take place substantially instantaneously, while the letting in of the clutch may be effected more slowly, according to the ratio of the speeds of revolution of the driving shaft and of the operating screw 64.

However, in this case, there should be disposed on link 68 a return spring 230 substantially stronger than the spring, or springs, of clutch 3 in order that the system, when left free, should bring the clutch in the position in which it is disengaged.

The clutch control device (screw-nut 64—65) is then so arranged that it causes the clutch to be let in when brake 59—62, or the clutch 59[1]—62[1] that controls it is actuated.

Fig. 19 shows an arrangement of this kind in which the clutch pedal 76 is in the position corresponding to the clutch being let in. The screw-nut system 64—65, as shown in this figure, is but little different from the corresponding systems shown in the preceding figures. However, in the present embodiment, in the position shown by the drawings, the nut is fully unscrewed with respect to the screw, so as to allow the clutch pedal 76 to come back to its position for which the clutch is let in under the action of the springs of clutch 3 acting through link 68. To this effect, the nut has had to overcome the resistance of spring 230 which constantly tends to bring the system back to the position for which the clutch is disengaged. The wedging action of the chain links is the same as that described with reference to Figs. 17 and 18, but it blocks the system in the position for which the clutch is let in, owing to the action of wedging spring 68[6] which, in this case, is intended to maintain the chain links 68[3]—68[4] in this position.

When it is desired to disengage the clutch, the electro-magnet 68[7] is energized; it neutralizes the action of the spring and brings the two chain links out of line with each other. Immediately the return spring 230 brings the whole of the system to the position for which the clutch is disengaged, and this as quickly as it is desired.

The characteristic of this mechanism is therefore that it causes the clutch to be instantaneously disengaged, while the rapidity of the letting in of the clutch depends on the speed of revolution of screw 64.

If it is desired to adjust, at the will of the driver, the rapidity with which the clutch is let in, the following arrangement may be utilized:

Parallelly to the link 68, which acts on the clutch pedal 76, there is disposed (Fig. 19) a mechanism having the following characteristics:

In a direction of displacement, this mechanism can be moved without any appreciable resistance. But when it is left to itself it comes back to its initial position in a given time.

Said mechanism comprises a cylinder 231 in which can slide a piston 232 which tends to be brought back to the position shown in Fig. 19 by spring 238. In the end of the cylinder there are provided, on the one hand, a small calibrated hole 239, which may be more or less stopped by a needle valve 234, which can be displayed by the drive through actuating means 235, and, on the other hand, an orifice 236, normally stopped by a ball 237, disposed in such manner as to allow air to penetrate into the cylinder but to prevent it from issuing therefrom.

If piston 232 is displaced toward the left hand side of Fig. 19, air is allowed to penetrate through valve 237 and the mechanism does not offer a substantial resistance to displacement in this direction. But if the piston is then released, it tends, under the action of spring 238, to come back to its initial position, but this movement can take place but very slowly because the valve closes and the piston is compelled to compress before it the air which can escape through the calibrated and adjustable orifice 233 but very slowly. It will therefore be readily understood that, by suitable adjusting the cross section of this orifice 232, with reference to spring 238, it is possible to exactly determine the time granted to piston 232 for coming back to its initial position.

In order to regulate the interval of time in the course of which the clutch is let in by means of one of these apparatus, for instance the piston apparatus that has just been described, the piston rod 232 is connected to the link 68 through which the pedal acts through connecting means that operate only for one direction of displacement, this direction being that for which piston 232 opposes no resistance. To this effect, link 68 is provided with a rod 68[a] which moves with said link and which carries a catch 240 capable of actuating the piston rod. But instead of directly actuating said piston rod, said catch acts on a lever 241 pivoted to the rod 243 of piston 232 and one end of which acts, on one side on a stop 242 carried by said rod 243 and on the other side on said catch 240.

The piston rod also carries, on a finger 244, a contact 245 which may cooperate with another contact 246 carried by lever 241 when, under the action of a spring 247, it may leave catch 242. Contact 246 is connected to the source of electric energy and contact 245 is connected to terminal 24[d].

The operation of this device is as follows:

While pedal 76 is moving in the direction for which the clutch is being disengaged, catch 240 acts on lever 241 and applies it against stop 242, thus moving contacts 245, 246 away from each other and driving piston 232 together with it.

If it is desired to let in the clutch, two cases may occur:

Either the mechanism that actuates pedal 76 moves more slowly than piston 232 would do if it were not connected to said mechanism. In this case, the pivoting lever 241 that carries contact 246 remains held between catch 240 and stop 242 and contacts 245 and 246 remain out of contact with each other, which does not modify in any way the operation above described.

Or the mechanism that actuates pedal 76 tends to move more quickly than piston 232. Catch 240 then moves away from stop 242 and lever 241 can pivot under the action of its spring 247, which closes the contacts 245—246. The latter then feed current to terminal 24d which stops the letting in of the clutch 3 and starts the disengaging thereof.

It is only when the rod of piston 232 overtakes link 68 that the letting in movement of the clutch can start again because, at this time, lever 241, held between catch 240 and stop 242, has again opened the contact at 245—246.

It is thus possible to very exactly determine the progressivity of the letting in of the clutch by merely adjusting the cross section of the outlet orifice 239 provided in the cylinder.

Of course all the systems that have been above described can be utilized either separately or in combination, in any suitable manner.

All the screw and nut systems that have been described up to now must be made with reversible screw threads. But my invention can quite as well be applied with irreversible screw threads.

But, in this case, it is necessary not only to slow down the displacement of the element, screw or nut, that it is desired to move axially with respect to the other element, nut or screw, that must remain stationary, but also to accelerate its displacement, so as to obtain axial displacements in both directions. Fig. 20 shows a mechanism made to this effect, and which might quite as well be used with reversible screw threads.

In this case the movement of shaft 66, which carries screw 64, is obtained as follows: said shaft is rigidly connected to the sun wheel 250 of a differential 251 shown in Fig. 20 in its most usual form, that is to say with bevel pinions. Said shaft also carries a brake drum 262 exactly similar to that shown in Figs. 15 and 16 and around which is wound a band 261 which can be brought into action by an electro-magnetic device 260, the whole as above described. On the other sun wheel 259 of the differential there is provided, in a likewise manner, a brake drum 362, with its band 361 and an electro-magnetic device 360. The element 257 of differential 251 carrying the planet wheels is driven by the engine of the vehicle through any suitable transmission, for instance a pulley 258. Said element 257 itself drives nut 65 through a sliding key, so as not to interfere with its axial movement.

The lever 21b of the clutch release device can come into engagement with two contacts disposed on either side of it, the contact 24d corresponding for instance to the disengaging of the clutch and the contact 24s corresponding to the letting in of the clutch. These contacts feed electro-magnetic devices 260 and 360 respectively, which devices act on the flexible bands 261 and 361 of the brakes respectively.

The operation of the device is as follows: If the clutch release device 21b is not in contact with either of 24d and 24s, screw 64 and nut 65, both driven at the same speed, do not move relatively to each other. It results therefrom that there is no axial displacement. Pedal 76 therefore remains in the position that it occupies and in which it is maintained by the irreversibility of the threads of screw 64.

If the clutch release device is in the position corresponding to the letting in of the clutch, it causes current to flow through contact 24s to the electro-magnetic device 360, which applies, for instance, brake 361 corresponding to sun wheel 259, which does not carry screw 64, and this sun wheel accordingly slows down. But it is known that in such a system, when a sun wheel slows down, the movement of the other one is accelerated. The speed of revolution of screw 64 is therefore increased with respect to that of driving shaft 1, while nut 65 keeps moving at a speed corresponding to that of said shaft 1. Accordingly there is produced an angular displacement between the screw and the nut, which causes one of said pieces, in the present case nut 65, to move axially.

If the direction of the threads of screw 64 and also the direction in which link 68 is moved are suitably chosen, the pedal 76 of the clutch is actuated in the direction for which the clutch is let in.

If on the contrary lever 21b closes contact 24d, it brakes, through the intermediary of electro-magnetic device 260 and brake 261, screw 64, the speed of revolution of which is accordingly reduced, while nut 65 is still driven at a speed corresponding to that of the engine. The resulting axial movement therefore takes place in a direction opposite to that above considered, and therefore produces the disengaging of the clutch.

Of course, with this device, one may utilize all the arrangements above described for limiting the displacements of the various devices that are utilized.

It should be noted that, in the embodiments of Figs. 13 to 20, the clutch pedal has been kept only for facilitating the description, the relation between said pedal and the clutch mechanism itself being well known. But this pedal is quite useless and can be done away with, or better it may be reduced to the portion thereof that acts as a lever, the remainder of the pedal being made removable and being kept in the tool box of the vehicle, in the same manner as the crank for manually starting the engine.

The gear box control device is intended to execute the operations ordered by the gear box release device. Fig. 11 shows in detail a device of that kind, capable of rotating disk 19' of Fig. 1, with its cams 20a and 20b, for actuating the internal members of said box and changing the speeds.

As above explained, the lever 21a of the gear box release device is capable of occupying three characteristic positions:

(A) An intermediate or neutral position;

(B) A position for which it is in contact with terminal 23m, which causes the electric servo-motor 22 to rotate and also rotates disc 19' in the direction that corresponds to the passing to a higher speed;

(C) A position for which lever 21a is in contact with terminal 23d, which causes the electric servo-motor to rotate in the opposite direction and rotates disk 19' in the direction that corresponds to passing to a lower speed.

It has also been explained that disk 19' must be able to occupy six characteristic angular positions (reverse gear, neutral, first, second, third, and fourth speeds), so that it must turn through 60° for passing from one speed to the next one.

The electric servo-motor can advantageously comprise two inductors connected in series with the armature. One of said inductors, fed through terminal $m^2$, (Fig. 11) causes the engine to turn in one direction when current is fed thereto through lever 21ª, connected to battery 58, and through terminal 23$^m$. The other inductor is fed through terminal $d^2$ and causes the motor to turn in the opposite direction when current is fed thereto through lever 21ª and terminal 23$^d$.

Fig. 11 shows the details of this mechanism.

Endless screw 23, driven by the servo-motor, meshes with a toothed wheel 79, keyed on a hollow shaft 80 freely mounted in concentric relation with the shaft 81 that carries disk 19 and distributor 98. On the hollow shaft 80 is slidably keyed a sleeve 83 provided with a groove 84 acting as a cam. In this groove is engaged a stationary finger 85 in such manner that, when the sleeve is rotated, it is caused to slide along hollow shaft 80. In the course of this translatory movement, a lug 86 carried by one of the ends of the sleeve engages one of the six notches 87 provided in a piece 88 keyed on the main shaft 81, thus causing the latter to move angularly through 60°. After this angular displacement, finger 85 causes sleeve 83 to move backwards, which uncouples sleeve 83 and shaft 81. Said shaft 81 is therefore left exactly in its new characteristic position, independently of the stopping of servo-motor 22.

Fig. 11 also shows the emergency means that may be utilized by the driver in the case of the automatic control system of the gear box failing to operate.

These means include a hand lever 89, preferably removable, in order that it may be kept under normal conditions in the tool box, which is fixed to a shaft 90 capable of oscillating and of sliding in its bearings. This shaft carries an arm 91 provided with at least one finger, in the form of a gear tooth, which, due to the oscillation of the shaft, can be brought to act on the teeth of a toothed wheel 93 keyed on shaft 81. The number of teeth and the amplitude of oscillation of the arm are such that for a full oscillation of lever 89, wheel 93 and shaft 81 are caused to rotate through 60°. If it is desired to bring back shaft 81 to its initial position, it suffices to displace lever 89 in the opposite direction. On the contrary if it is desired to further turn shaft 81 through 60° in the same direction shaft 90 is caused to slide a sufficient distance in order that tooth 92, when lever 89 is moved backward, is no longer located opposite the teeth of wheel 93. After having thus moved lever 89 in a backward direction, shaft 90 is caused to slide until it again occupies its initial position, so that it may produce a new rotation of 60° of shaft 81. It is advantageous to provide marks that determine the extreme positions of shaft 90 in both directions and to this effect I may provide on the lower end of lever 89 a projection 94 capable of being displaced, on one side or on the other against a vertical plate 95 and to pass over said plate for the extreme positions of lever 89.

Owing to the intermittent control mechanism (through the servo-motor or through lever 89) the main shaft 81 is driven only for a determined portion of a turn, in each direction of rotation, and in the present instance, through 60°.

If the control of the clutch and of the gear box can be made entirely automatic, there is however an operation that depends entirely on the decision of the driver, it is that which permits to start the vehicle in the forward or the backward direction, or to place the engine in neutral. The object of the present invention is to make this operation as simple as possible, and, to this effect, to reduce it to the displacement of a handle 96 or of any analogous control organ. This handle is connected for instance, through an ordinary main circuit-breaker, 97, to battery 58 and can be brought upon one of the three contacts $av$, $pm$, $ar$, so as to feed electric circuits leading to a distributor 98 through which servo-motor 22, and therefore disk 19', with its cams 20ª, 20$^b$ for actuating the control rods 14ª, 14$^b$ of the gear box, are controlled. This distributor is in the form of a disk, but it might be of another form.

The distributor, the details of which are visible in Fig. 1, is keyed on shaft 81 and is electrically insulated therefrom. It comprises conducting zones and insulating zones. Stationary brushes, for instance six in number, are disposed opposite disk 98, for instance along a radius thereof. Brush $d^1$ is connected to terminal $d^2$ of the servo-motor that, when fed with current, brings into play the inductor that causes the motor 22 to rotate in the direction that causes passing to lower speeds. Brush $m^1$ is connected to the terminal $m^2$ of the motor 22 in order to cause the latter to rotate in the direction that corresponds to passing to higher speeds. Brush $p^1$ is connected to contact $p^m$ of handle 96. Brush $ar^1$ is connected to contact $ar$. Brushes $a^m$ and $a^d$ are connected respectively to the terminals 23$^m$ and 23$^d$ of the lever 21ª of the gear box release device, said lever being itself connected to the contact $av$ of handle 96.

If handle 96 is brought upon contact $ar$, lever 21ª is not inserted in the circuit, but the current is fed directly to brush $ar^1$. If shaft 81 is already in the position corresponding to reverse gear, the feed circuit of motor 22 is opened owing to the shape given to the central conducting portion 98 and shaft 81 therefore remains in the position it occupies. On the contrary, if this shaft is not in the correct position, the current passes through contact $ar$, brush $ar^1$, the conducting part 98$^1$, brush $d^1$ and terminal $d^2$ of motor 22. The latter turns in the direction that corresponds to passing to lower speeds until disk 19 has reached an angular position for which the reverse gear control 14$^c$ has moved fork 18 in such manner as to bring into mesh the series of gear wheels that corresponds to reverse gear. At this time the current is cut off between brushes $ar^1$ and $d^1$.

Being in reverse gear, if the driver places the handle 96 on contact $pm$, the current passes through brush $p^1$, the conducting portion 98$^2$ and brush $m^1$ connected to terminal $m^2$, so that the motor 22 turns in the direction corresponding to passing to higher speeds. The current is cut off between these brushes when disk 98 reaches the position corresponding to neutral gear (Fig. 1).

If disk 98 had been in any of its characteristic positions corresponding to first, second, third or fourth speed the contact between handle 96 and contact $pm$ would have caused the current to pass through brush $p^1$, the conducting portion 98$^1$ and brush $d^1$, which would have fed motor 22 through terminal $d^2$ (toward lower speeds) until disk 98 had reached the characteristic position corresponding to neutral gear (Fig. 1).

If the handle 96 is placed on contact $av$, the current is fed to lever 21ª and the latter distributes it, according to the needs, to contact 23m or to contact 23d. If contact 23m is closed, the current passes through brush $a^m$, the conducting portion 98², brush $m^1$ and terminal $m^2$. If contact 23d is closed, current passes through brush $a^d$, the conducting portion 98¹, brush $d^1$ and terminal $d^2$. If lever 21ª remains between the two contacts 23m and 23d, the circuits are open at this point. The automatic working of the device therefore takes place normally for passing from neutral gear to fourth speed (supposed to be the highest) or on the contrary from fourth speed down to first speed.

When the engine is in fourth gear, brush $m^1$ is close to an insulating portion 98³ which automatically cuts off the circuit of the motor if disc 98 has a tendency to go beyond this position. In a similar manner, the circuit is automatically cut off by an insulating portion 98⁴ if, handle 96 being placed on contact $av$, disc 98 tended to move beyond the position corresponding to neutral.

The distribution of the current therefore complies with the requirements of the automatic working that have been stated and necessitates only the displacement of handle 96 by the driver.

It should be noted that the utilization of a clutch control device 57 having a reciprocating motion permits of doing away with the necessity of a rotary servo-motor for controlling the passing from one speed to another.

Such an arrangement is shown in Fig. 21.

The clutch control device is for instance analogous to that shown in Fig. 19 (with the exception of the adjusting system); however the devices that shall be described in the following description could be applied to any other alternative servo-motor, whatever be the nature of the energy through which it is actuated (mechanical energy, gas or liquid under pressure, atmospheric pressure acting against a rarefied fluid, such as may be produced by the suction of the engine).

However, the displacement of the operating lever 69 of the clutch is slightly increased in order that, if $a—b$ is the displacement necessary for operating the clutch, lever 69, or any other lever actuated by servo-motor 57, is given, under the impulsion of the latter, a supplementary displacement $b—c$.

When said lever reaches point $b$, it comes into contact with another lever 78 capable of causing a plate 200 to slide parallelly to itself on a guide 201, which is adapted to oscillate about a stationary point 202.

In the course of its displacement $b—c$, lever 69, or any other lever rigidly connected thereto, causes plate 200 to move forward. During the return stroke a spring 203 brings it back toward its initial position by bearing against a suitable stop 204. The axis of symmetry of plate 200 moves in the vicinity of the axis of shaft 81, which causes the speed to be changed. This shaft 81 carries two ratchet wheels 205 and 206 the teeth of which are inclined in opposite directions respectively. Two pawls 206m and 205d mounted on plate 200 are capable, but only under certain circumstances, of engaging ratchet wheels 205 and 206.

As each of these wheels includes six teeth, plate 19 is caused to rotate through 60° in the direction that corresponds to passing to a higher speed if pawl 206m has engaged ratchet wheel 206, or in the opposite direction if pawl 205d has engaged ratchet wheel 205.

However, if guide 201 is in its intermediate position, in which it is maintained by springs 207, none of the pawls 206m and 205d, maintained by a suitable stop, can engage with the corresponding ratchet wheel. But if guide 201 is inclined in one direction it permits one of the pawls, for instance pawl 206m to come into contact with the corresponding ratchet wheel, without allowing the other pawl, 205d, which is moved farther from the corresponding ratchet wheel, to act. When guide 201 is inclined in the opposite direction, pawl 205d is brought into play and 206m cannot act.

These inclinations of guide 201 are obtained by drawing in suitable directions two electro-magnetic plungers 208m and 208d which are connected, through an electric circuit, to the terminals 23m and 23d of the gear box release device 21ª.

Guide 201 further carries a current distributor 21c, capable of coming into contact with contacts 24e and 24f, which are both electrically connected with contact 24d, which causes the clutch reciprocating actuating means to work in the manner above described.

The operation of this device is as follows:

If the release devices for letting in the clutch and for disengaging it are in positions for which the clutch is to be disengaged, they feed, as above explained, electric current to contact 24d, which brings into play the clutch control device 57. The working takes place as above described; however it causes plate 200 to be driven along its guide 201, which does not matter from the point of view of the passing from one speed to another, since guide 201 remains held in its intermediate position and thus pawls 206m and 205d can exert no action whatever on the ratchet wheels and on shaft 81. On the contrary, when the gear box release device is in a position corresponding to the passing from one speed to another one, it closes, through its lever 21ª, the electric circuit at one of the contacts, for instance 23m. Plunger 208m, thus brought into play, causes guide 201 to pivot, thus bringing pawl 206m into its operative position with respect to ratchet wheel 206. The pivoting displacement of guide 201 closes contact 24f, which feeds current to contact 24d, thus bringing into play clutch 57.

The latter first causes the clutch to be disengaged during the displacement $a—b$ of lever 69. During the displacement $b—c$, this lever displaces plate 200, causing it to slide on its guide 201. Pawl 206m engages ratchet wheel 206 and causes it to rotate through an angle of 60° in the direction that corresponds to passing to a higher speed. Shaft 81 is driven simultaneously. At the end of the displacement, the current is cut off through distributor 24f, which allows the release device for letting in the clutch to come back to its initial position, in such manner that the clutch mechanism can again be let in for a new combination of gear wheels that has been brought into play by the rotation of shaft 81 through an angle of 60°.

The single clutch control device can thus ensure the working both of the clutch mechanism and of the gear box.

Fig. 21 further discloses other devices, shown in detail in the preceding figures, grouped in such manner as to form a whole which may be considered as forming a second embodiment of the invention. In this figure it has been endeavoured to reduce as much as possible the scale on which the different mechanisms have been shown in order to make it possible to realize the space that they occupy. However it should be noted that in most cases the space occupied by the devices as shown in the drawings is still much greater than what it is really. Other devices (and among these the control and distribution device for bringing the engine into neutral gear, into direct gear and into reverse gear, including handle 96 of Fig. 1, or the device, embodying handle 56 of Fig. 1, through which the conditions of working of the release devices can be modified) have not been included in Fig. 21 because they are unnecessary for a good understanding thereof. On the contrary, said Fig. 21 shows a release system A analogous to that of Figs. 4 to 10, a clutch release device B analogous to that of Fig. 19, a control device C for free wheel running analogous to that shown in Fig. 1, and also a connection D between the throttle pedal 48 and the whole of release devices A. As for the gear box control device E it has just been described.

The operation of the arrangement which is the object of the present invention is as follows:

When the motor is turning slowly and the transmission is in neutral, the handle 96 is engaged with the contact $pm$, the source of electricity 58 is joined to the contact $p^1$ which itself is opposite an insulating section $98^3$ of the plate 98 so that the servo-motor 22 cannot be supplied with current by one or the other of its terminals $m^2$ or $d^2$.

The accelerator pedal 48 is released so that the contact $18^2$ connects the contact $24^d$, which controls the disengagement of the clutch 3 by the servo-motor 64, 65, to the source 58 in such a manner that it is certain that the transmission is disconnected from the engine. Besides, the contact $18^1$, which serves to supply current to the speed shifting control lever $21^2$ is open, so that the speed shifting mechanism cannot operate.

In order to start forward movement of the vehicle, the operator begins by moving the handle 96 to engage contact $av$ which connects the contact $18^1$ to the source of electricity, this contact however remaining open. Besides the contacts $a^d$ and $a^m$ are arranged respectively opposite the conductive parts $98^1$ and $98^2$ ready to feed the contacts $d^1$ and $m^1$ connected respectively to the terminals $d^2$ and $m^2$ of the servo-motor 22.

At this time the motor continues to turn slowly but the clutch 3 cannot be engaged because the contact $18^2$ is closed and the gear box 4 cannot be shifted because the contact $18^1$ is open. When the operator depresses the accelerator pedal 48, the contact $18^2$ is opened so that the clutch 3 is left exclusively to the automatic control by its disengaging lever $21^b$ while the shifting lever $21^a$ is connected directly to the source of electricity 58. As the opposing spring 30 is at this moment the only active factor which intervenes in the control of the control levers $21^a$ and $21^b$, and as this spring urges the lever 31 upward (Fig. 1), the lever $21^a$ engages its contact $23^m$, the lever $21^b$, the contact $24^d$, and the latch 39 is engaged behind the nose 41 so as to hold the clutch 3 disengaged.

As the contact $23^m$ is supplied with current through the lever $21^a$, the current passes through the contacts $a^m$ and $m^1$ to the terminal $m^2$ of the servo-motor which sets in motion the plate 19 towards its position corresponding to first speed forward. There has been described above, with respect to Fig. 11, the arrangement which prevents this position from being passed.

As the speed of the motor increases, the masses 25 of the centrifugal regulator 27 tend to separate against the action of spring 30 which, besides, moves the lever $21^a$ away from the contact $23^m$, this lever moving until it occupies its intermediate position shown in Fig. 1. Finally, the action of the regulator acting on the rod 37, becomes sufficient to overcome the tension of spring 40, which releases the lever $21^b$, and to move the lever $21^b$ against the contact 24 so that the clutch 3 is maintained in engagement. When this occurs, the contact 60 and the solenoid 59 are no longer supplied with current, so that the servo-motor 64, 65 no longer operates and the usual springs on the clutch 3 can cause the clutch to engage and move the control member 69 to the position shown in Fig. 1. The vehicle is thus started in motion in first speed through the gears $4^3$, $4^4$, by the intermediate shaft $4^2$ and the gear $5^1$.

When the pedal 48 is further depressed, there is obtained not only an increase in the speed of the motor but also an increase in the effect of the spring 30 by the displacement of the roller 46 longitudinally of the slide or slot 45. But if the force of the centrifugal regulator is sufficient, this pushes rod 36 toward the right (Fig. 1), which causes the nose 41 to slide longitudinally of the bent latch 39. When the nose 41 disengages said latch, the rod 31, urged by the spring 30, will cause the lever $21^b$ to swing to engage the contact $24^d$, while the latch 39 engages in front of the nose 41 and holds the said lever $21^b$ in its position of clutch disengagement, in which the contacts $24^d$ and 60 are supplied with current, which produces the disengagement of the clutch 3.

The centrifugal regulator soon afterwards moves lever $21^a$ against contact $23^m$, which produces through the servo-motor 22 a shift to second speed. By this shift the speed of the motor is diminished, and the masses of the regulator approach each other, which moves the lever $21^a$ away from the contact $23^m$, and the lever $21^a$ moves to occupy its neutral position. At the same time the spring 40 disengages the latch 39 from the nose 41 and the engaging lever $21^b$ of the clutch leaves the contact $24^d$ which permits the engagement of the clutch 3. The shifts to the combinations for third speed and for direct drive are made in the same manner.

When the speed of the motor decreases (for example when the operator stops feeding fuel or when going up a hill), the masses 25 of the regulator 27 approach each other and the spring 30 becomes preponderant.

At the same time, the spring 40 moves the latch 39 away from the nose 41, so that the spring 30 can cause the lever $21^b$ for disengaging the clutch to swing into engagement with the contact $24^d$ and to produce disengagement of the clutch 3. The nose 41 thus engages behind the latch 39. At the same time, and under the preponderant action of spring 30, lever $21^a$ swings and comes into contact with the contact $23^d$, which feeds the servo-motor 22 by the contacts $a^d$ and $d^1$ and by the terminal $d^2$. The servomotor 22 then turns in a direction so as to displace the plate 19 toward its position corresponding to the next lower gear combination. When this position is reached and the new combination is engaged, it is obvious that the speed of the motor increases for this reason, with the result that the masses of the regulator 27 separate and move the lever $21^a$ back to its neutral position while the rod 36, being pushed by the regulator 27, moves the nose 41 away from latch 39, and moves the lever 21b out of contact with the contact 24d so as to produce engagement of the clutch.

The descending speed shifts are thus obtained from direct driven down to neutral.

If the operator, when the vehicle is in third speed for example, and as shown in Fig. 1, decides to put the transmission in neutral, he places the handle on the surface $pm$ which connects the source of current 58 directly, without passing through the lever 21a, to the contact $d^1$ by the surface $p^1$ and the conductive part $98^1$ of the plate 98, which then feeds the servo-motor 22 by the contact $d^1$ and terminal $d^2$ and causes it to turn in the direction for decreasing speeds until the surface $p^1$ reaches a non-conductive part $98^3$ of the plate 98 which automatically interrupts the supply of current. At this moment the plate 98 occupies its characteristic position corresponding to idling. If during these operations the pedal 48 is released, as will naturally occur, the contact $18^2$ is closed which produces continuous disengagement of the clutch 3.

Being in neutral, if the operator wishes the vehicle to move backwards, he places the handle 96 on the surface $ar$ connected to contact $ar^1$. The current then passes through conductive part $98^1$, contact $d^1$ and terminal $d^2$ of the servo-motor 22 which turns in the direction of decreasing speed until the plate 19 reaches its characteristic position corresponding to rearward movement, for which the control lever 14d is displaced by the groove 20d. At this moment the current is interrupted between the contacts $ar^1$ and $d^1$.

During this operation the pedal 48 is naturally released, that is to say, the contact $18^2$ is closed and the clutch 3 disengaged. To start the vehicle moving backward, it is sufficient for the operator to press on the pedal 48 and the same operations will take place as for putting it in forward movement in first speed, with only this difference, that the engagement of lever 21a with contact $23^m$ is ineffective for the reason that contact $a^m$, at this time, is opposite insulating portion $98^3$ of plate 98 which interrupts the feeding current to terminal $m^2$ of the servo-motor 22.

In the preceding portion of the description, I have explained in detail how the operations, produced by the electric controls, are carried out by the clutch servo-motor 3 and by the gear box servo-motor 4. While several modifications have been indicated on the drawings, the method of operation of these different mechanisms has been explained, in a very detailed manner, with respect to the description of each particular modification.

While I have described what I deem to be preferred embodiments of my invention, it should be well understood that I do not wish to be limited thereto as there might be changes made in the arrangement, disposition, and form of the parts without departing from the principle of my invention as comprehended within the scope of the appended claims.

What I claim is:

1. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to affect said control members, a common means for exerting an opposing effect on said control members, and means to equalize the effect of said last means on said members.

2. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a common means for exerting a force opposing such movement of said control members, and means to equalize and distribute said opposing force on said control members.

3. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, and means connecting said spring to said control members to resist such movement thereof, said connecting means including a common means to equalize the force exerted by said spring on said members.

4. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, and means connecting said spring to said control members to resist movement thereof, said connecting means including means to equalize the force exerted by said spring on said members, said equalizing means comprising a pivoted beam in engagement with both said control members and subject to the force of said spring at a point intermediate its ends.

5. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a common means for exerting a force opposing movement of said control members, and means to equalize and distribute said opposing force on said control members, said equalizing means comprising a plate against the center of which said force is exerted, and means engaging said plate at points away from the center and operatively associated with said control members.

6. In combination, in a vehicle having an engine and a variable speed transmission and a clutch mechanism connected therewith, automatic means for controlling said transmission and clutch mechanism including control members for said transmission and clutch mechanism, a governor driven by said engine, means to equalize and distribute the force exerted by said governor on said control members, said equalizing means comprising a plate against the center of which said force is exerted, and means engaging said plate at points away from the center and operatively associated with said control members, and a common means for exerting a force opposing movement of said control members.

7. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, means connecting said spring to said control members to resist movement thereof, said connecting means including means to equalize the force exerted by said spring on said members, and means controlled in accordance with the load on the engine to control and vary the force exerted by said spring.

8. In combination, in a vehicle having an engine provided with a carburetor and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, means connecting said spring to said control members to resist movement thereof, said connecting means including means to equalize the force exerted by said spring on said members, and means controlled by the suction in the carburetor to control and vary the force exerted by said spring.

9. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, means connecting said spring to said control members to resist movement thereof, said connecting means including means to equalize the force exerted by said spring on said members, said equalizing means comprising a pivoted lever acted on by said spring and operatively connected to said control members, and means controlled in accordance with the load on the engine to shift the pivot point of said lever, whereby to control and vary the force exerted by said spring.

10. In a device as claimed in claim 1, means controlled by the speed of the engine to lock the clutch mechanism control member in clutch engaging position at a predetermined speed.

11. In a device as claimed in claim 1, means controlled by the speed of the engine to lock the clutch mechanism control member in clutch engaging position at a predetermined speed, and means controlled by the speed of the engine to render said retaining means inoperative when the speed of the engine drops below said predetermined speed.

12. In a device as claimed in claim 1, means controlled by the speed of the engine to lock the clutch mechanism control member in clutch engaging position at a predetermined speed, and means controlled by the speed of the engine to render said retaining means inoperative when the speed of the engine drops below said predetermined speed, said last means comprising means to exert a counterforce different from the force which causes the clutch mechanism control member to assume its clutch engaging position.

13. In combination with a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, and means connecting said spring to said control members to resist movement thereof, said connecting means including means to equalize the force exerted by said spring on said members, means controlled in accordance with the load on the engine to control and vary the force exerted by said spring, and manually adjustable means to limit the amount of variation of the force of said spring.

14. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, means connecting said spring to said control members to resist movement thereof, said connecting means including means to equalize the force exerted by said spring on said members, a pivoted lever acted on by said spring and operatively connected to said control members, means controlled in accordance with the load on the engine to shift the pivot point of said lever, whereby to control and vary the force exerted by said spring, and manually adjustable means to limit the movement of said pivot comprising an adjustable plate having an opening therein and a projection connected to said pivot and extending into said opening.

15. In combination, in a vehicle having an engine and a variable speed transmission and a clutch mechanism connected therewith, automatic means for controlling said transmission and clutch mechanism including control members for said transmission and clutch mechanism, mechanism controlled in dependence on the speed of some moving part of the vehicle which varies during the operation of the vehicle to exert a force, means to connect said last mechanism to said control members, said means including a pair of levers, one connected to said last mechanism and the other to said transmission control member, said levers being pivoted at opposite ends and overlapping each other at their free ends, whereby the point of engagement between said levers varies as the levers turn, a common means for exerting an opposing force on said control members, and means to equalize the force exerted by said last means on said members.

16. In combination, in a vehicle having an engine and a variable speed transmission and a clutch mechanism connected therewith, automatic means for controlling said transmission and clutch mechanism including control members for said transmission and clutch mechanism, mechanism controlled in dependence on the speed of some moving part of the vehicle which varies during the operation of the vehicle to exert a force, means to connect said last mechanism to said control members, said means including a pair of levers, one connected to said last mechanism and the other to said transmission control member, said levers being pivoted at opposite ends and overlapping each other at their free ends, whereby the point of engagement between said levers varies as the levers turn, means to adjust the amount of overlap between said levers, a common means for exerting an opposing force on said control members, and means to equalize the force exerted by said last means on said members.

17. In combination, in a vehicle having an engine and a variable speed transmission and a clutch mechanism connected therewith, automatic means for controlling said transmission and clutch mechanism including control members for said transmission and clutch mechanism, a transmission control shaft controlled by the transmission control member, mechanism controlled in dependence on the speed of some moving part of the vehicle which varies during the operation of the vehicle to exert a force, means to connect said last mechanism to said control members, said means including a pair of levers, one connected to said last mechanism and the other to said transmission control member, said levers being pivoted at opposite ends and overlapping each other at their free ends, whereby the point of engagement between said levers varies as the levers turn, means to adjust the amount of overlap between said levers, said last means comprising a cam on said control shaft and means operated by said cam to shift the pivot of at least one of said levers, a common means for exerting an opposing force on said control members, and means to equalize the force exerted by said last means on said members.

18. In combination in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a spring, means connecting said spring to said control members to resist movement thereof, said connecting means including means to equalize the force exerted by said spring on said members, and means controlled in accordance with the load on the engine to control and vary the force exerted by said spring on said control members, said last means comprising a manual throttle valve control element, and a bell crank lever having one end connected to said force varying means and the other end connected with the throttle valve and having its fulcrum connected to said control element.

19. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, said means including a governor driven by said engine and having a pair of members slidable in accordance with the speed of the engine and means connecting said governor members to the transmission control member and the clutch control member respectively, a common means for exerting an opposing force on said control members, and means to equalize the force exerted by said last means on said members.

20. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a common means for exerting an opposing force on said control members, means to equalize the force exerted by said last means on said members, a servo-motor controlled by the transmission control member for operating the variable speed transmission, an intermediate coupling between the servo-motor and the variable speed transmission, and means to hold said coupling engaged while said servo-motor turns through a predetermined angle, and to disengage the coupling automatically as soon as this angular movement is accomplished.

21. In combination, in a vehicle having an engine and a variable speed transmission and a clutch mechanism connected therewith, automatic means for controlling said transmission and clutch mechanism including control members for said transmission and clutch mechanism, means controlled in dependence on the speed of some moving part of the vehicle which varies during the operation of the vehicle to move said control members, a common means for exerting an opposing force on said control members, means to equalize the force exerted by said last means on said members, and manually operable means for moving said variable speed transmission when said automatic means fails.

22. In a device as claimed in claim 20, an auxiliary manually operable means to move said variable speed transmission.

23. In a device as claimed in claim 2, means operated by the power of the engine and controlled by the clutch control member to operate said clutch mechanism.

24. In a device as claimed in claim 2, a reciprocating element connected to the clutch mechanism, and means operated by the power of the engine and controlled by the clutch control member to reciprocate said element.

25. In a device as claimed in claim 2, a reciprocating element connected to the clutch mechanism, means operated by the power of the engine and controlled by the clutch control member to reciprocate said element, a member mounted for sliding and pivoting movement, means connecting said last member to said reciprocating element to be moved thereby, means controlled by said transmission control member to swing said sliding and swinging member, and means operated by such sliding and swinging movement to control said transmission.

26. In a device as claimed in claim 2, a reciprocating element connected to the clutch mechanism, means operated by the power of the engine and controlled by the clutch control member to reciprocate said element, a member mounted for sliding and pivoting movement, means connecting said last member to said reciprocating element to be moved thereby, said last means including a lost motion connection whereby movement of said element first disengages the clutch mechanism and then moves said sliding and swinging member, means controlled by said transmission control member to swing said sliding and swinging member, and means operated by such sliding and swinging movement to control said transmission.

27. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, and means controlled by said clutch control member to brake the other of said elements.

28. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, an electromagnetic brake for exerting a braking force on the other of said elements, and means controlled by said clutch control member to supply current to said brake.

29. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, an electromagnetic brake for exerting a braking force on the other of said elements, means controlled by said clutch control member to supply current to said brake, and means for automatically breaking off the supply of current to said brake when the clutch mechanism is disengaged.

30. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, mechanical means controlled by said clutch control member to brake the other of said elements, and means controlled by the position of the element which is connected to the clutch to render said braking means inoperative.

31. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, mechanical means for braking the other of said elements, an electromagnet controlled by said clutch control member to actuate said braking means, and means controlled by the position of the element which is connected to the clutch to render said braking means inoperative.

32. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, means controlled by said clutch control member to brake the other of said elements, a toggle mechanism comprising a pair of pivotally connected links one of which is connected to the clutch operating element and the other of which is fixed, said links being aligned when the clutch is engaged, and means controlled by said clutch control member to move said links out of alignment.

33. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, means controlled by said clutch control member to brake the other of said elements, a toggle mechanism comprising a pair of pivotally connected links one of which is connected to the clutch operating element and the other of which is fixed, said links being aligned when the clutch is engaged, and means controlled by said clutch control member to move said links out of alignment, said last means comprising an electromagnet.

34. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, means controlled by said clutch control member to brake the other of said elements, a spring tending to hold said clutch mechanism in engaged position, a second spring stronger than said first spring connected to said clutch operating member and tending to disengage the clutch mechanism, a toggle mechanism comprising a pair of pivotally connected links one of which is connected to the clutch operating element and the other of which is fixed, said links being aligned when the clutch is engaged, and means controlled by said clutch control member to move said links out of alignment.

35. In a device as claimed in claim 2, means controlled by said clutch mechanism control member to operate the clutch mechanism comprising two elements having a threaded engagement with one another, one of which is connected to the clutch mechanism, means connecting one of said elements to the engine to be driven thereby, means controlled by said clutch control member to brake the other of said elements, a spring tending to hold said clutch mechanism in engaged position, a second spring stronger than said first spring connected to said clutch operating member and tending to disengage the clutch mechanism, a toggle mechanism comprising a pair of pivotally connected links one of which is connected to the clutch operating element and the other of which is fixed, said links being aligned when the clutch is engaged, and means controlled by said clutch control member to move said links out of alignment, said last means comprising an electromagnet.

36. In a device as claimed in claim 2, means for automatically disengaging the clutch mechanism when the engine is not operating against a load.

37. In a device as claimed in claim 2 having a throttle valve control element, means controlled by movement of said element to closed position for automatically disengaging said clutch mechanism.

38. In a device according to claim 2, a shaft connecting said clutch mechanism and said variable speed transmission, and differential means including members driven at the speed of the engine and at the speed of said shaft to disengage said clutch when said engine and shaft are running at substantially different speeds.

39. In a device according to claim 2, a shaft connecting said clutch mechanism and said variable speed transmission, and differential means including members driven at the speed of the engine and at the speed of said shaft to disengage said clutch when said engine and shaft are running at substantially different speeds, said members having a threaded engagement with one another.

40. In a device according to claim 2 in which said clutch control member includes a switch, and an electric circuit in which said switch is interposed and the closing of which causes disengagement of the clutch mechanism, a shaft connecting said clutch mechanism and said variable speed transmission, differential means comprising two elements having threaded engagement with one another, one driven by said engine and the other by said shaft, and means operated by relative movement between said members to close said circuit and thereby to disengage said clutch.

41. In a device as claimed in claim 2, a pendular mass mounted on said vehicle, and means connecting said mass to said clutch control member whereby sudden acceleration of the vehicle moves said clutch control member to disengage the clutch mechanism.

42. In a device as claimed in claim 1, means controlled by the speed of the engine to lock the clutch mechanism control member in clutch engaging position at a predetermined speed, a pendular mass mounted on said vehicle, and means connecting said mass to said clutch control member whereby sudden acceleration of the vehicle moves said clutch control member to disengage the clutch mechanism.

GASTON FLEISCHEL.